US008300565B2

(12) United States Patent
Jantunen et al.

(10) Patent No.: US 8,300,565 B2
(45) Date of Patent: Oct. 30, 2012

(54) MULTI MODE HOST INTERFACE FOR AND REMOTE REGISTER AND MEMORY ACCESS OF A WIRELESS COMMUNICATION MODULE

(75) Inventors: Joni Jantunen, Helsinki (FI); Hannu Laine, Espoo (FI); Antti Lappetelainen, Espoo (FI)

(73) Assignee: Nokia Corporation, Espoo (FI)

( * ) Notice: Subject to any disclaimer, the term of this patent is extended or adjusted under 35 U.S.C. 154(b) by 1216 days.

(21) Appl. No.: 11/382,141

(22) Filed: May 8, 2006

(65) Prior Publication Data

US 2007/0258377 A1    Nov. 8, 2007

(51) Int. Cl.
*G08C 17/00*    (2006.01)
(52) U.S. Cl. .................................................. 370/311
(58) Field of Classification Search .................. 370/232, 370/299, 300, 311
See application file for complete search history.

(56) References Cited

U.S. PATENT DOCUMENTS

| 5,461,611 | A | * | 10/1995 | Drake et al. ................... 370/420 |
| 5,617,236 | A | * | 4/1997 | Wang et al. .................... 398/117 |
| 6,112,080 | A | * | 8/2000 | Anderson et al. ........... 455/422.1 |
| 6,223,196 | B1 | * | 4/2001 | Hattori et al. ................. 708/523 |
| 6,603,744 | B2 | * | 8/2003 | Mizutani et al. .............. 370/310 |
| 7,016,695 | B1 | * | 3/2006 | Bahai ............................ 455/466 |
| 7,079,811 | B2 | * | 7/2006 | Lee et al. ..................... 455/41.2 |
| 7,236,576 | B2 | * | 6/2007 | Schnarel et al. .......... 379/142.01 |
| 7,286,796 | B2 | * | 10/2007 | Izumi ........................... 455/41.1 |
| 7,454,222 | B2 | * | 11/2008 | Huang et al. .................. 455/522 |
| 2003/0135797 | A1 | * | 7/2003 | Choi .............................. 714/704 |
| 2004/0071285 | A1 | * | 4/2004 | Satoh et al. .................... 379/419 |
| 2004/0154318 | A1 | | 8/2004 | Roh et al. |
| 2004/0177132 | A1 | | 9/2004 | Zhang et al. |
| 2004/0248514 | A1 | * | 12/2004 | Idani et al. .................... 455/41.2 |
| 2005/0014468 | A1 | * | 1/2005 | Salokannel et al. .......... 455/41.2 |
| 2005/0070227 | A1 | * | 3/2005 | Shen et al. .................... 455/41.3 |
| 2005/0180458 | A1 | * | 8/2005 | McGregor ..................... 370/468 |
| 2006/0253894 | A1 | * | 11/2006 | Bookman et al. ................. 726/2 |
| 2007/0082699 | A1 | * | 4/2007 | Karaoguz et al. ........... 455/553.1 |
| 2007/0105548 | A1 | * | 5/2007 | Mohan et al. ............... 455/426.1 |
| 2007/0264962 | A1 | * | 11/2007 | Ueno et al. ................... 455/343.2 |

FOREIGN PATENT DOCUMENTS

EP    0871138 A2    10/1998

(Continued)

OTHER PUBLICATIONS

Ben-ze'ev, Y. et al., "Bluetooth evolve verso I processori Applicativi," Elettronica Oggi, Sep. 2001, Gruppo Editoriale Jackson, Italy, ISSN 0391-6391, No. 304, pp. 78-81.

(Continued)

*Primary Examiner* — Anh-Vu Ly
*Assistant Examiner* — Mohammad Anwar
(74) *Attorney, Agent, or Firm* — Banner & Witcoff, Ltd.

(57) ABSTRACT

Techniques and systems are provided for a wireless communication module to identify whether a host is present and may configure the module in response. Different modes of operation in a wireless communication module enable a full host mode, a simplified host mode, or a host-less mode of operation of a communication module, such as a low end extension of Bluetooth communication module. Other techniques and systems control a communication module remotely. A wireless connection may be used to write to and read from registers and a memory space associated with the remote wireless communication module.

42 Claims, 16 Drawing Sheets

FOREIGN PATENT DOCUMENTS

| | | |
|---|---|---|
| EP | 1455272 A2 | 9/2004 |
| KR | 2006-0019153 A | 3/2006 |
| WO | 2005057956 A1 | 6/2005 |
| WO | 2007074365 A2 | 7/2007 |

OTHER PUBLICATIONS

Honkanen, Mauri, Lappeteläinen, Antti, and Kivekäs, "Low End Extension for Bluetooth," IEEE Radio and Wireless Conference RAWCON 2004, Atlanta, GA, Sep. 2004, pp. 19-22.

International Preliminary Report on Patentability for International Application No. PCT/IB2007/0000984, mailed Nov. 20, 2008, 5 pages.

Communication pursuant to Article 94(3) EPC for Application No. 07734303.6, mailed Aug. 28, 2009, 5 pages.

Korean Intellectual Property Office Non-Final Rejection for Application No. 10-2008-7029095, mailed Sep. 6, 2010.

* cited by examiner

| Lsb | | | | | | | | | Msb |
|---|---|---|---|---|---|---|---|---|---|
| SAR (1) | ACK (1) | SN (1) | TYPE (5) | Payload length (8) | FLOW (1) | FLUSH (1) | FU (1) | Header check (5) | Payload Max 255 bytes | CRC (16) |

FIGURE 12

| lsb | | | | | msb |
|---|---|---|---|---|---|
| FU (3) | Unicast channel (5) | Source address (40) | R/W (1) | Register Address (7) | Register Value (8) |

FIGURE 13

| Lsb | | | msb |
|---|---|---|---|
| R/W (1) | Register Address (7) | Register Value (8) | Success code (8) |

FIGURE 14

| lsb | | | Msb |
|---|---|---|---|
| FU (2) | R/W (1) | Unicast channel (5) | Source address (40) |

FIGURE 16

| LSB | MSB |
|---|---|
| Memory Type (8) | Success code (8) |

FIGURE 17

| lsb | | | | Msb |
|---|---|---|---|---|
| Start address (16) | R/W (1) | Length (7) | | Memory value (if Write) (max 128 bytes) |

FIGURE 18

| lsb | | | | Msb |
|---|---|---|---|---|
| Start address (16) | R/W (1) | Length (7) | Success (8) | Memory value (if Read) (max 128 bytes) |

FIGURE 19

MULTI MODE HOST INTERFACE FOR AND REMOTE REGISTER AND MEMORY ACCESS OF A WIRELESS COMMUNICATION MODULE

FIELD OF INVENTION

The invention relates to wireless communication networks. More specifically, the invention relates to short range radio communication modules with multi-mode host interfaces.

BACKGROUND

In a full operation mode, a low-rate radio communication module requires communication with a host module that controls the operation and data flow between the host module and the low-rate radio communication module. A host interface is usually implemented as a serial interface, such as a serial peripheral interface (SPI), a universal asynchronous receiver/transmitter (UART), or other similar interface. However, in some cases, communication modules can also operate without any control from a host module. In such cases, the data flow and/or operation mode is limited in some extent in comparison with a full operation mode. For example, data transmitted by a communication module might be constant so no data flow from a host module to a communication module is needed. Also, the behavior of a communication module may be constant which makes the existence of a controlling host module unnecessary. However, for initialization, operation control, and communication control, a host module has always been required.

In some cases, a default operation requires the existence of a host module that can offer complete control of data flow. On the other hand, the existence of a complete host module is not necessary if the application or the use does not necessitate it. In some cases, a very low amount of varying data is transferred in one packet and a duty cycle may be very low as well. At a minimum, payload information, such as a sensor value, might be only one bit or a byte, and in some applications, a packet frame containing an identification (ID) of a device indicating the existence of a device inside of a communication range is sufficient. As such, reduced host functionality/implementation is appropriate although the lower layers in the full extent are required.

Today, a host interface, such as an upper layer host interface (ULIF), of a communication module, such as a Bluetooth Low End Extension (BT-LEE) module, does not support different modes of operation. A host module and its active control exist for a default ULIF mode. However, implementations that target to extremely low power and simple applications requiring less power consumption of a host module are lacking. BT-LEE technology allows small devices to connect to other devices, such as mobile terminals, without the power and cost burden of traditional Bluetooth technology. Typical small devices include sensors, such as temperature sensors, toys, wireless pens, headsets, and other remote user interface peripherals. Further information regarding BT-LEE technology is described in Mauri Honkanen et al., "Low End Extension for Bluetooth," IEEE Radio and Wireless Conference RAWCON 2004, Atlanta, Ga., September, 2004, pages 19-22.

Conventionally, devices with a short-range radio connectivity capability are implemented so that a host layer or unit, e.g. a micro-controller, controls the Medium Access Control (MAC) layer of a wireless communication module. FIG. 1 illustrates a conventional communication module 101. For example, when utilizing Bluetooth technology, interface 103 between a host layer or unit 105 and the MAC layer 107 is referred to as a Host Controller Interface (HCI). When utilizing BT-LEE technology, interface 103 is referred to as an Upper Layer Interface (ULIF). In relatively simple applications, a host layer 105 is not mandatory from the perspective of communication. As such, the functionality of host layer 105 can be significantly cut down. Additionally, the limited power resources of small devices necessitate that power consumption be minimized and pressure to minimize manufacturing costs drive manufacturers to develop simpler implementations. Therefore, it would be advantageous to minimize the requirements for a host layer.

Today, a BT-LEE communication module implementation does not support configuration of registers 109 or the use of memory space 111 remotely over an air interface. A full host implementation and its active control exist if registers 109 of the communication module 101 were configured. Implementations targeting extremely low power and simple applications do not require large power consumption by a full host module and therefore access to registers 109 and memory space 111 over an air interface would be advantageous.

SUMMARY

Aspects of the present invention are related to a new communication protocol, BT-LEE (low end extensions for Bluetooth), which is related to Bluetooth technology and aims at providing a simplified low rate communication. In accordance with aspects of the present invention, three different modes of operation in a communication module enable a simplified host or host-less implementation of a BT-LEE communication module. As a remote BT-LEE device, such as a device that contains a measurement sensor, requires little or no user input, there is no need for the BT-LEE device to communicate with some higher software layers implemented in a host module. Rather, in accordance with aspects of the present invention, communication occurs with a remote site over a wireless channel.

Aspects of the present invention provide a BT-LEE module that identifies the kind of environment it is located within, i.e., the module determines whether a host is present, which may configure the device, or not, so that standard configuration may be loaded. Identification of the kind of environment may occur during setup, e.g., power up. As described below, identification may occur through a connection of a data bus that would be used to communicate with a host module.

Still other aspects of the present invention are directed to a method to control a BT-LEE module remotely. Such remote control may be needed if no local host device is present that configures and controls the BT-LEE module. In accordance with aspects of the present invention, a wireless connection may be used to write to and read from registers and memory in a remote BT-LEE module.

In accordance with still other aspects of the present invention, communication modules, such as BT-LEE modules, may be controlled with a simplified host module and/or without an active host module. In addition, aspects of the present invention provide a method for a communication module to detect if a host module is present and whether the host module is a simplified or a full host. A communication module supports one or more of the following example host modes: full host mode, simplified host mode, and host-less mode. In full host mode, complete control and data flow of a communication module is possible. In simplified host mode, data flow is limited and control of a communication module by a host module is not necessary after an initialization phase. In host-less mode, no control or data flow is needed and therefore a host module is not necessary.

This summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

FIG. 12 illustrates an example packet format of a general DATA_PDU data packet in accordance with at least one aspect of the present invention;

FIG. 13 illustrates an example packet format of a general REGISTER_ACCESS_REQUEST data packet in accordance with at least one aspect of the present invention;

FIG. 14 illustrates an example packet format of a general REGISTER_ACCESS_RESPONSE data packet in accordance with at least one aspect of the present invention;

FIG. 16 illustrates an example packet format of a general MEMORY_ACCESS_REQUEST data packet in accordance with at least one aspect of the present invention;

FIG. 17 illustrates an example packet format of a general MEMORY_ACCESS_READY data packet in accordance with at least one aspect of the present invention;

FIG. 18 illustrates an example packet format of a general MEMORY_ACCESS_DATA_REQUEST data packet in accordance with at least one aspect of the present invention;

FIG. 19 illustrates an example packet format of a general MEMORY_ACCESS_DATA_RESPONSE data packet in accordance with at least one aspect of the present invention;

DETAILED DESCRIPTION

In the following description of various illustrative embodiments, reference is made to the accompanying drawings, which form a part hereof, and in which is shown, by way of illustration, various embodiments in which the invention may be practiced. It is to be understood that other embodiments may be utilized and structural and functional modifications may be made without departing from the scope of the present invention.

In accordance with aspects of the present invention, a multi-mode host interface is introduced that allows more efficient use of a communication module in a wider range of applications. Applications described herein include use of communication modules with a very simple host module in addition to use without a host module.

In accordance with other aspects of the present invention, registers and memory of a communication module may be accessed remotely over an air interface without the existence or any actions from a conventional host layer. Data packets are used to transfer configuration data to registers and to read and write data from and to memory space of a communication module. In remote memory access, buffer memory of a BT-LEE communication module may be used in a similar manner as RFID tags are used to store data.

Different host interface modes, full-host, simplified host, and host-less, for wireless communication modules are described in detail herein. Different from a full-host mode, which is a conventional implementation, a simplified host mode and host-less mode do not necessitate register or memory access capabilities from a host layer. In such modes, devices may communicate, at least in a default mode, without a host layer. In accordance with aspects of the present invention, without a host layer, changing of default register values of a communication module is now possible.

Figure 1:
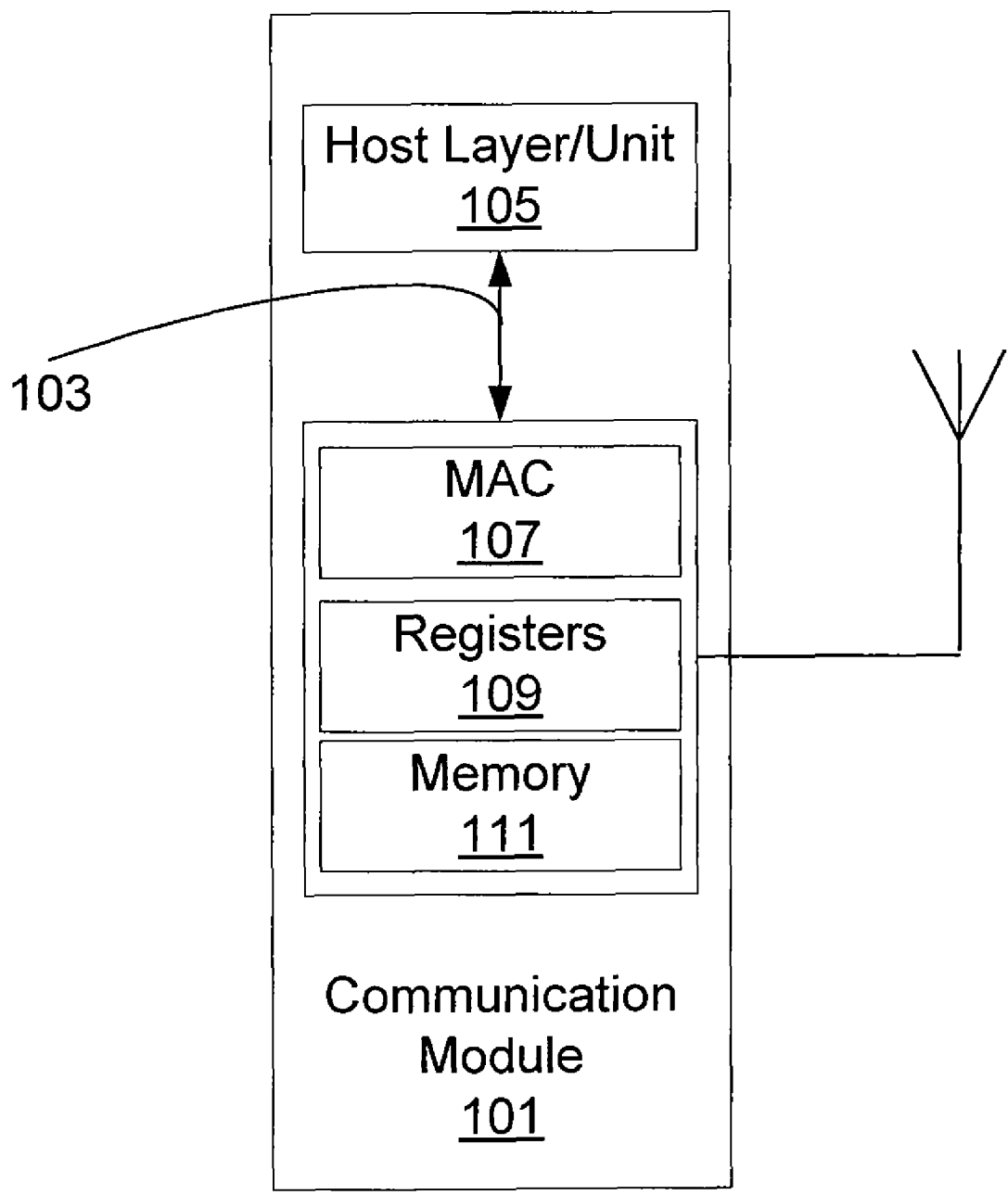
FIG. 1 illustrates an example of a conventional wireless communication module.
Figure 2:
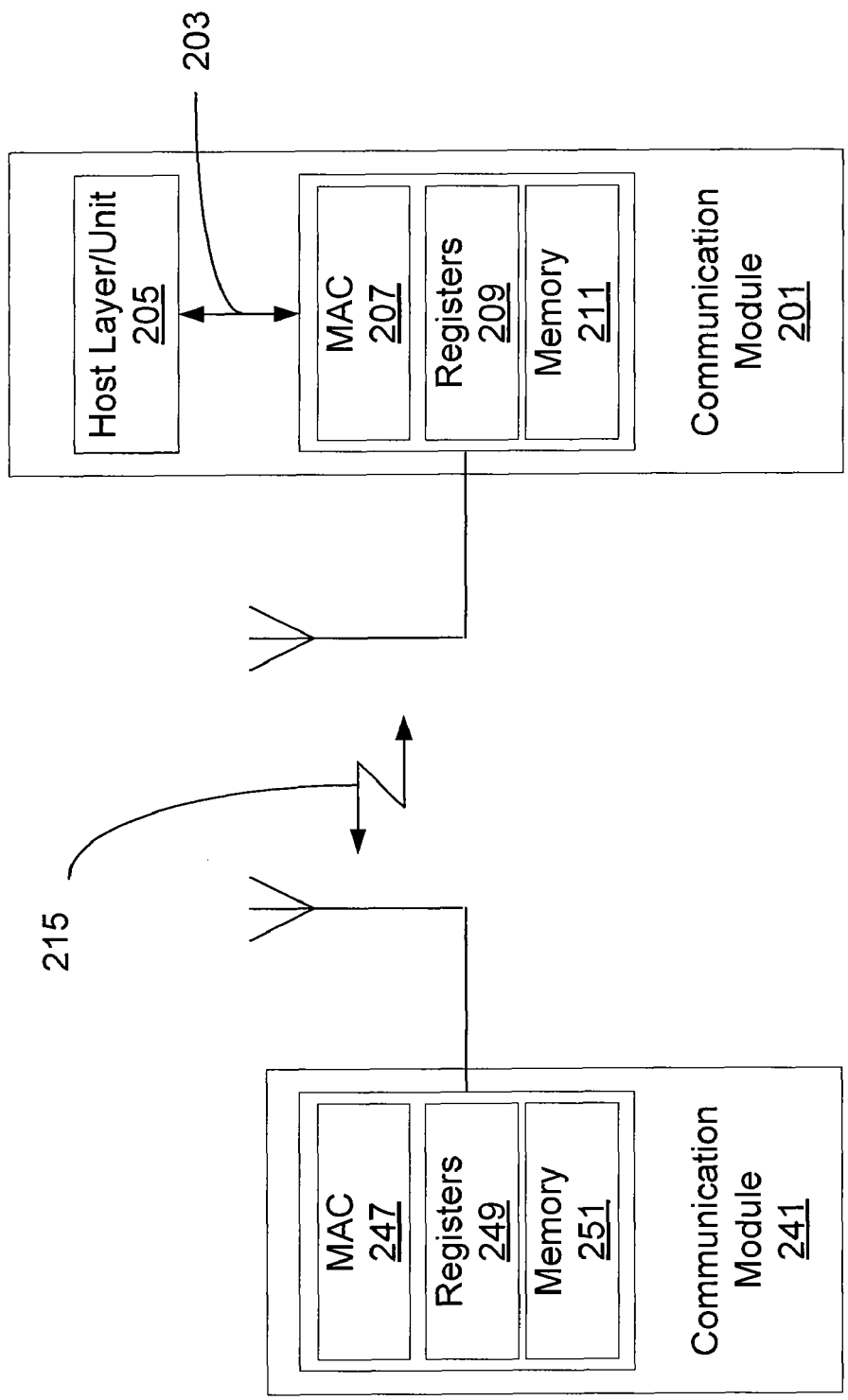
FIG. 2 illustrates an example of a system of wireless communication modules in communication in accordance with at least one aspect of the present invention.

As shown in FIG. 2, communication module 201 includes an interface 203 between a host layer or unit 205 and a MAC layer 207. Communication module 201 is also shown to include register 209 and a memory space 211. Registers 249 and memory 251 of a communication module 241 may be accessed over an air interface 215 without the existence or any actions from a host layer in that module. The host layer or unit 205 of communication module 201 handles over the air interface 215 the functions of a host layer of communication module 241. In such a configuration, no host processor is needed in communication module 241 and communication module 241 may be run in simplified host or host-less mode. Access to register 249 and memory 251 over air interface 215 also allows the use of communication module 241 in a mode that is similar to radio frequency identification (RFID) tag technology.

A communication module in accordance with at least one aspect of the present invention supports one or more of the following example host modes: a full host mode, a simplified host mode, and a host-less mode. In a full host mode operation, complete control and data flow of a communication module is possible. Full host mode is the conventional manner in which control and data flow have been handled. In a simplified host mode operation, the data flow is limited and control of a communication module by a host module is not necessary after a simple initialization phase. In a host-less mode operation, no control or data flow is needed and therefore a host module is not necessary.

The signals of a host interface, such as interface 203, may be used to select an operation mode when a communication module is released from a reset state. After the mode selection period, signals may be used in a specified way depending on the selected mode. In a full host mode operation, a host interface may be used conventionally. In a simplified host mode operation, the host interface signals may be re-used to input a limited amount, in comparison with a full host mode operation, of defined, e.g., sensor, data to a communication module. In a host-less mode operation, the host interface signals may be unused after the mode selection period.

If a selected mode is not a full host mode, a communication module configures itself autonomously so that other devices may establish a wireless communication channel, such as air interface 215. When two devices are in communication, at least one of the two devices, which initiates a communication set-up of the wireless communication channel between the two devices, operates in a full-host mode operation. The scaling of a host interface, such as interface 203, for different applications enables simpler implementations since all the upper layer protocols are not needed. The following applications are examples of operation in different host modes.

A full host mode operation may be used in sensor devices that contain several sensors. In such cases, data flow may need to be controlled actively. A wrist-top computer is an example where a ULIF interface in full host mode operation may be used.

A simplified host mode operation may be used in a single sensor application where the sensor data includes limited amounts of data, e.g. one byte of data or less, and the data is transferred over an air interface in a limited time sequence. In a simplified host mode operation, a sensor controller transfers the sensor data to a communication module which forwards the data over an air interface in a packet, such as a DATA-packet or ServiceField part of an ID-packet.

A host-less mode operation may be used where no changing data is transferred over an air interface. In a host-less mode operation, only the identification (ID) of a device may be transmitted. An example application for the use of a host-less mode includes an intelligent bunch of keys. In such an application, it may be sufficient that another device, e.g., a mobile terminal, knows that another device, operating in a host-less mode, is inside of an established communication range. If the bunch of keys is moved outside of the established communication range, an alarm may be given via a user interface of the mobile terminal.

The following sections illustrate example implementations of different host interface modes in the case that a serial peripheral interface (SPI) interface is used to control a BT-LEE communication module. It should be understood by those skilled in the art that similar implementations may be made using other serial interfaces, such as UART.

Full-Host Mode—Conventional ULIF Interface

Figure 3:
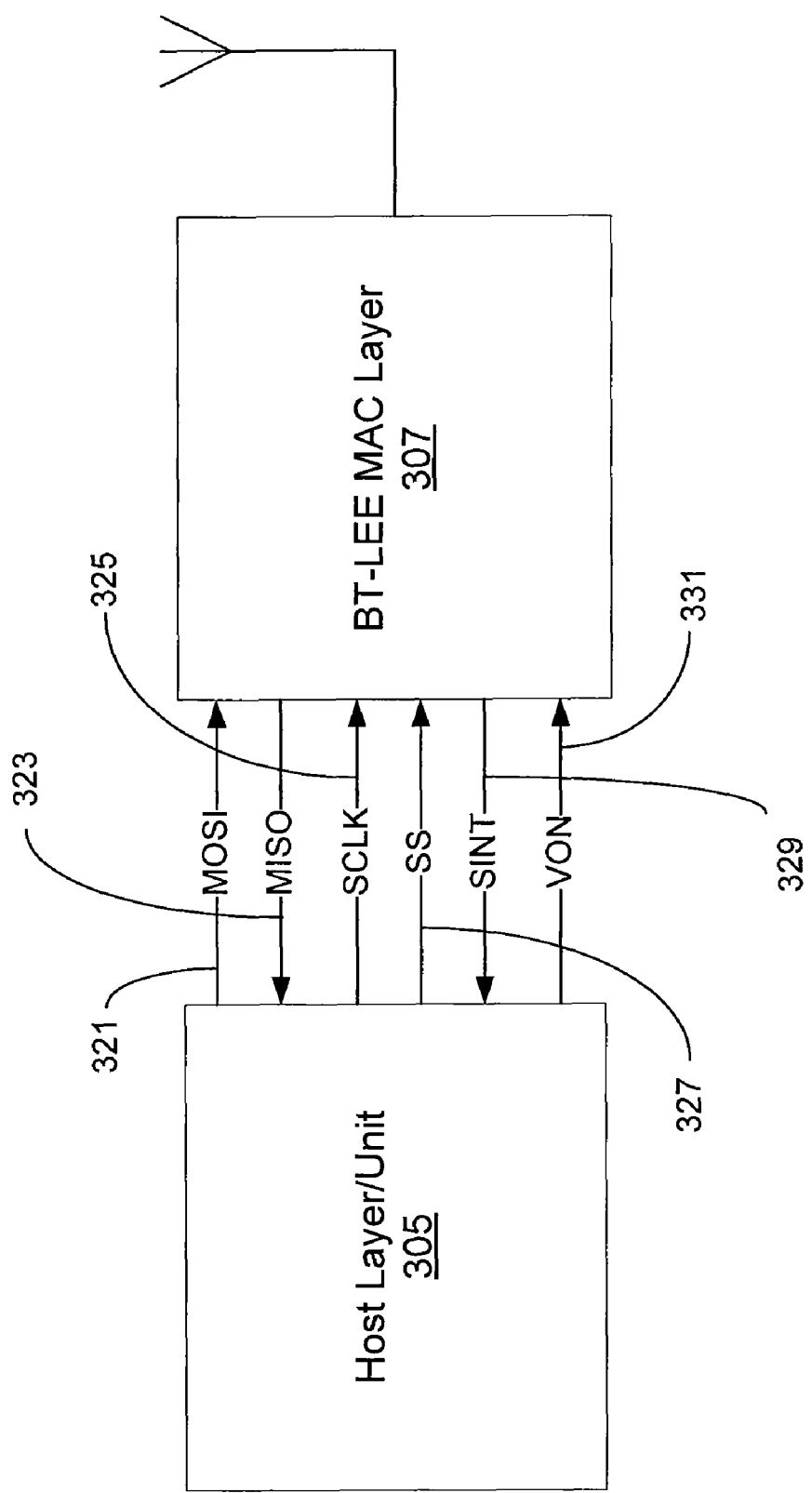
FIG. 3 illustrates signals and directions between a host layer and a BT-LEE MAC layer in accordance with at least one aspect of the present invention.

FIG. 3 illustrates signals utilized on ULIF type interfaces. In a full-host mode operation, a BT-LEE communication module with a MAC layer 307, acts as a serial peripheral interface (SPI) slave. An additional SINT, slave interrupt, signal 329 is used from the MAC layer 307 to the host layer of unit 305 to enable fast communication without polling. A voltage on/off (VON) signal 331 from the host layer to the BT-LEE MAC layer is used to activate the BT-LEE communication module. VON signal 331 may be regarded as a reset signal.

The same signals 321-331, e.g., the same physical interface that is used in a full-host mode operation, may also be used in a simplified host mode operation and host-less mode operation. The directions of the signals are the same in all modes. The active host mode may be selected by setting the control signals into valid positions during a reset period. The following sub-sections describe the properties of a host-less and simplified host mode operations.

The default active state of a BT-LEE MAC layer 307 may be an Advertisement state. In the Advertisement state, the device transmits ID-packets periodically and all other devices inside of an established communication range may receive the ID-packets and initiate a connection when needed. The ID-packets may include ServiceField data and the ID of the device.

A BT-LEE MAC layer 307 delivers the information about the host mode of the device in the ServiceField data of the ID-packet. The ServiceField data value defines what the capabilities of the device are to a connection initiator over an air interface. A number of different configurations for the structure of the ID-packet and the ServiceField data may be used.

Host-Less Mode

When a BT-LEE communication module is used in a host-less mode operation, no active data is transferred on a ULIF interface. In host-less mode operation, no connection set-up over an air interface is required. The host-less mode is selected in the reset phase as illustrated by example in FIG. 4. The BT-LEE MAC then enters an Advertisement state. In the host-less mode operation, the content of ServiceField data is basically constant and DATA-packets are not transferred in this case.

Register configuration and memory access may be established over an air interface although the device is used in a host-less mode operation. Memory access over an air interface enables tag-like functionality. To enable register and memory access of a BT-LEE MAC communication module over an air interface connection, establishment of a connection may be required. The description of register configuration and memory access is described in more detail below.

Simplified Host

When a BT-LEE communication module is used in a simplified host mode operation, the Slave Select (SS) signal 327, the Master Out, Slave In (MOSI) signal 321, and the Serial Clock (SCLK) signal 325 signals are reused to input data from the host 305 to the BT-LEE MAC layer 307. In contrast with the full-host mode operation, during a simplified host mode operation, the host controller 305 is not required to run the BT-LEE MAC layer 307 driver and only a limited amount of variable data may be sent to the communication module by the host 305. The simplified mode operation is divided into two sub-modes: ServiceField sub-mode and Payload sub-mode. One difference between the ServiceField and Payload sub-modes is that a ServiceField sub-mode does not necessitate a connection set-up procedure over the air interface. A Payload sub-mode requires a connection set-up procedure. The content of a service field may be updated depending on the status of the simplified host layer (e.g., a simple sensor). In Payload sub-mode, the connection set-up procedure is performed, but the data transferred over the air interface is generated by the simplified host and therefore the data from the simplified host may be limited.

In the ServiceField sub-mode, the SS 327, MOSI 321, and SCLK 325 signals are used to change the ServiceField contents of an ID-packet. Using these signals, eight (8) different values for the ServiceField contents may be varied. The communication module may use MISO signal 323 to trigger new values to the SS 327, MOSI 321, and SCLK 325 signals. For example, the input data may be information as to whether a sensor value has exceeded some threshold value. The ID-packets may be accessible by any BT-LEE device within operational range.

In the Payload sub-mode, a small amount of data is sent in a payload field of a DATA-packet over an active connection. The establishment of the connection is required in the Payload sub-mode which enables access control of devices allowed to connect and acquire data.

Mode Selection

Figure 5:
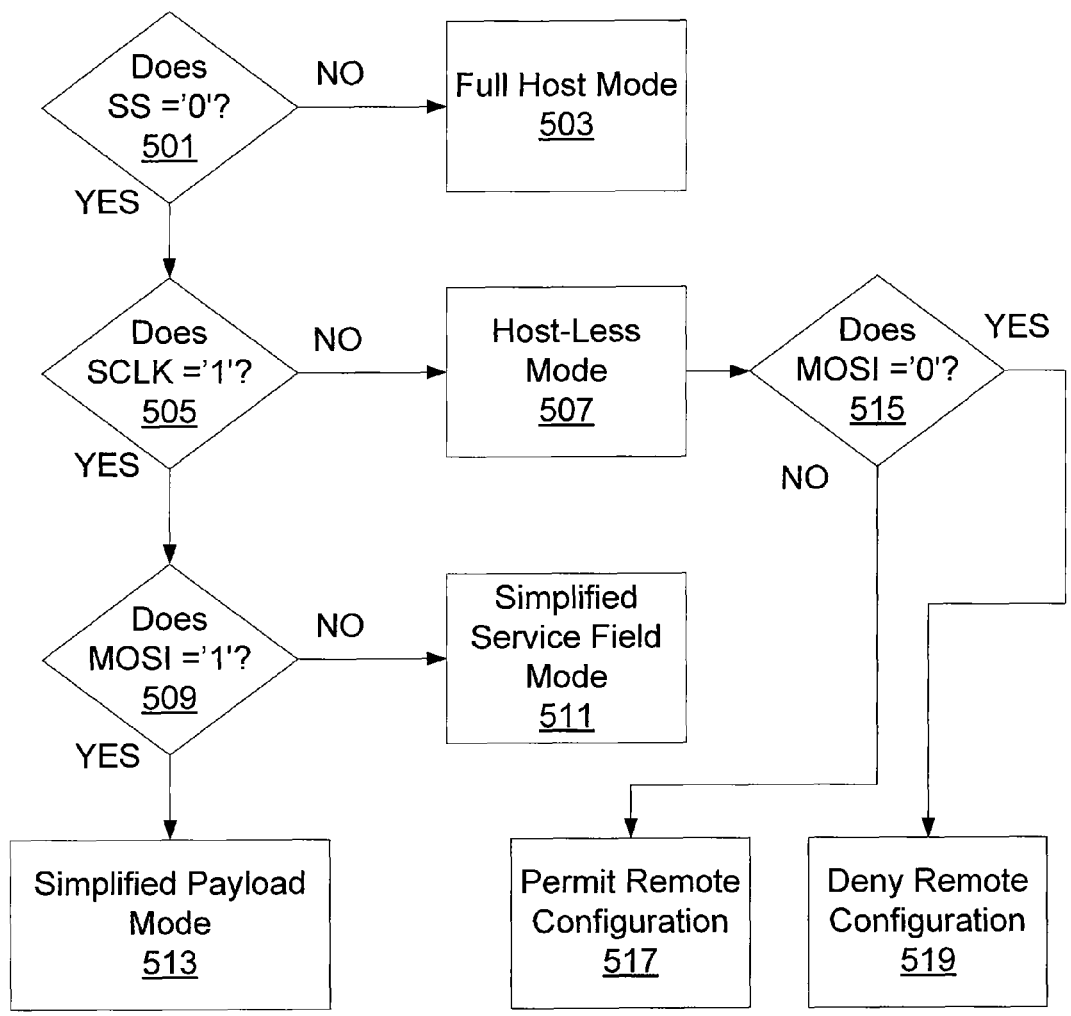
FIG. 5 is a flowchart of an illustrative method for selection of a mode for a host interface in accordance with at least one aspect of the present invention.

The following describes how the selection between different mode operations may be established. A mode may be selected by setting signals into pre-defined positions before a mode selection period. The flowchart in FIG. 5 illustrates an example method for selecting a host mode operation by using ULIF signals SS, MOSI, and SCLK. A selection determination is made when VON signal, such as VON signal 331, changes from '0' to '1'. As shown, at step 501, a determination is made as to whether the SS signal is equal to '0'. If not, full host mode operation is established in step 503. If SS signal does equal '0', the process moves to step 505 where a determination is made as to whether SCLK signal is equal to '1'. If not, host-less mode operation is established in step 507. If SCLK signal does equal '1', the process moves to step 509 where a determination is made as to whether MOSI signal is equal to '1'. If not, simplified host mode operation and ServiceField sub-mode is established in step 511. If MOSI signal does equal '1', the process moves to step 513 where simplified host mode operation and Payload sub-mode is established. From host-less mode operation 507, an optional number of steps may include determining, at step 515 whether MOSI signal is equal to '0'. If not, at step 517, remote configuration of registers, such as registers 249, in a corresponding device may be permitted. Else, at step 519, remote configuration of registers is denied.

The values of the signals may be defined in a case where signals SS, SCLK, and MOSI are connected to ground, i.e., '0'. In that case, the host-less mode operation may be selected as a default and the lowest power consumption is achieved by connecting the signals to ground and not to the supply voltage.

Full-Host Mode

Figure 4:
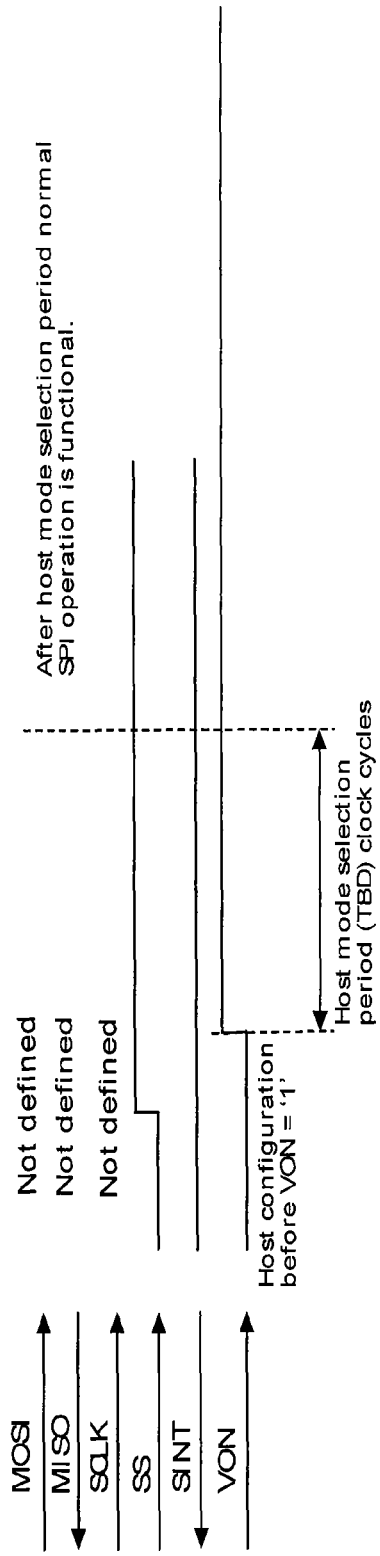
FIG. 4 illustrates a signal pattern corresponding to mode selection for a full host mode operation in accordance with at least one aspect of the present invention.
Figure 6:
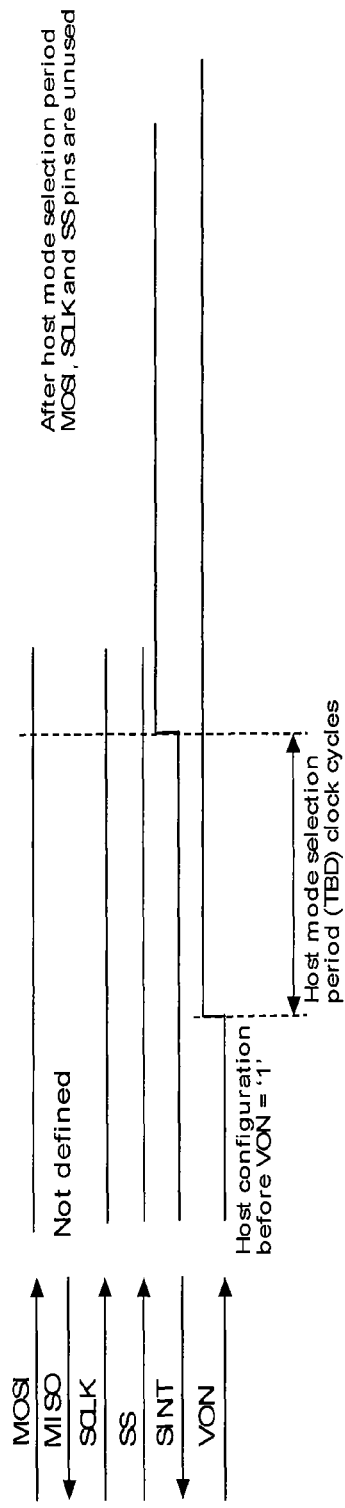
FIG. 6 illustrates a signal pattern corresponding to mode selection for a host-less mode operation in accordance with at least one aspect of the present invention.

As shown in FIG. 4 and in FIG. 6, a full host mode is selected by setting SS signal to '1' before VON is set to '1'. Signal SS may be '1' at least for the host mode selection period, such as a defined number of clock cycles, after the VON signal is set to '1'. In comparison with the host-less mode and simplified host mode, in full host mode operation, the SINT signal is '0' during and also immediately after the host mode selection period. When host-less or simplified host modes are selected, the SINT signal goes from '0' to '1' when the host mode selection period is over. The SINT is left to '0' in full-host mode to ensure compatibility with current ULIF implementation. In full-host mode operation, the setting of the SINT signal to '1' indicates that an indication or response message from BT-LEE MAC to host layer is ready to be transferred. During host mode selection, no ULIF messages are transferred and therefore the SINT is left to '0' when full-host mode is selected.

Host-Less Mode

As shown in FIG. 5, host-less mode operation is selected by setting the SS signal to '0', and the SCLK signal to '0', before the VON signal is set to '1'. By setting SINT signal from '0' to '1', BT-LEE MAC indicates that the mode has been selected successfully.

Simplified Host Mode

As shown in FIG. 5, to choose simplified host mode operation, the SS signal is set to '0' and the SCLK signal is set to '1' before activating the VON signal. The ServiceField sub-mode is selected when MOSI signal is set to '0' and Payload sub-mode when MOSI signal is set to '1'. One difference between the ServiceField and Payload sub-modes is where a packet of data is transferred. In ServiceField sub-mode, data is transferred in the ServiceField of an ID-packet. In Payload sub-mode, data is inserted into the DATA-packets.

Figure 7:
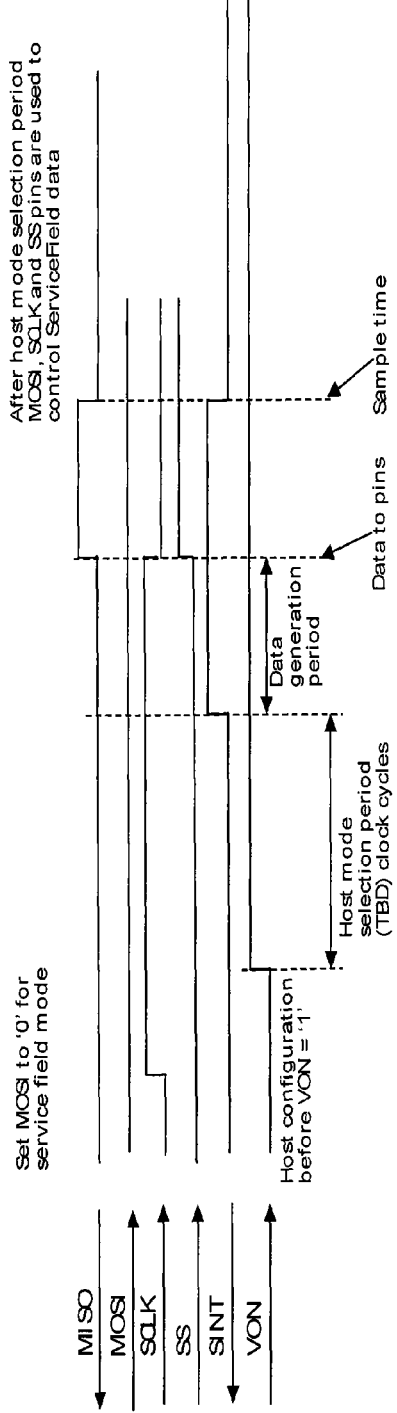
FIG. 7 illustrates a signal pattern corresponding to mode selection for a simplified host mode operation in a Service-Field sub-mode in accordance with at least one aspect of the present invention.
Figure 8:
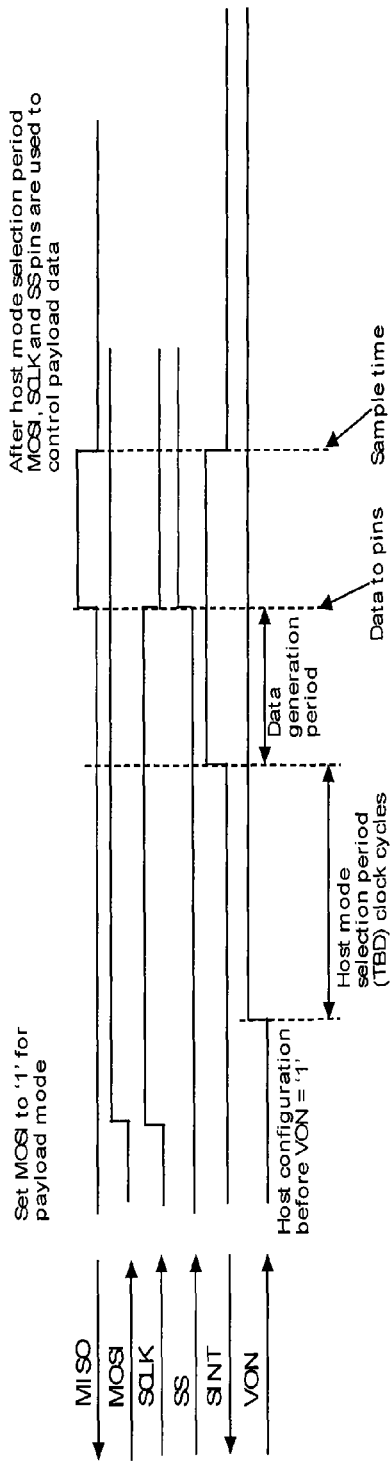
FIG. 8 illustrates a signal pattern corresponding to mode selection for a simplified host mode operation in a Payload sub-mode in accordance with at least one aspect of the present invention.
Figure 9:
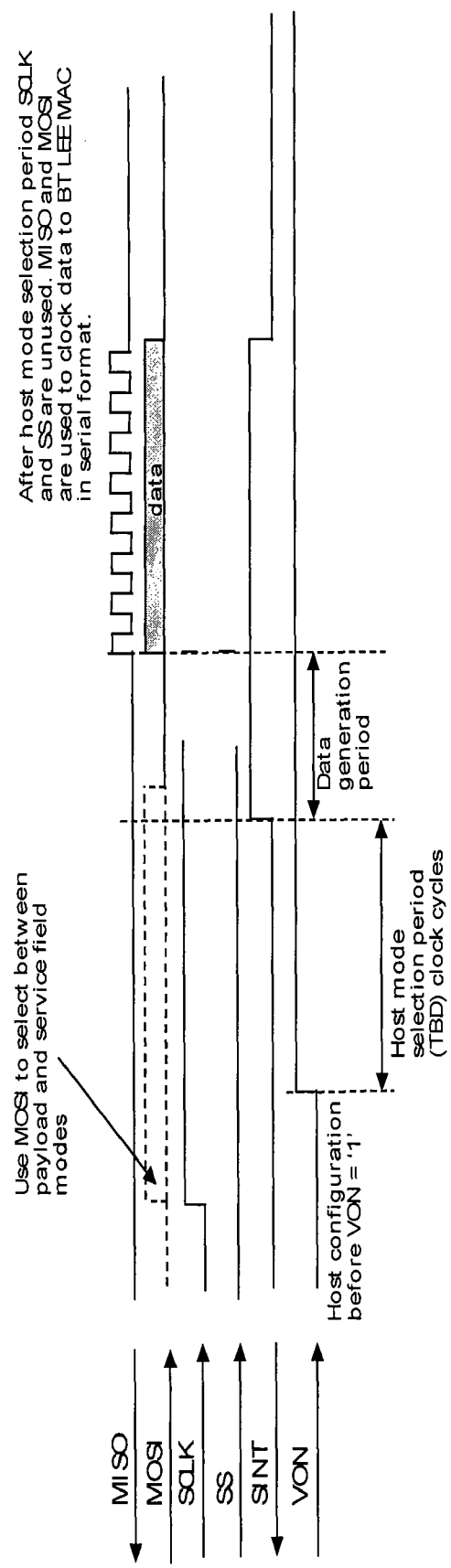
FIG. 9 illustrates another signal pattern corresponding to mode selection for a simplified host mode operation in accordance with at least one aspect of the present invention.

After a mode selection period, such as a predefined number of clock cycles, the SINT signal is set to '1' and MOSI, SCLK, and SS signal pins are used to control advertised ServiceField, in ServiceField sub-mode, or payload bits, in Payload sub-mode. SINT signal may be used to interrupt the simplified host to start generating new data. When the data is sampled, the MISO signal is used as a sample clock; data may be set at a rising edge and sampled at a falling edge such as shown in FIG. 7 for ServiceField sub-mode and FIG. 8 for Payload sub-mode). In accordance with another implementation, the MISO signal may be used as a serial clock and as a data line to transfer data from a simplified host. FIG. 9 illustrates such an example implementation. In such a configuration, signals SCLK and SS are unused.

Current conventional implementation of a host interface is always in a full-host mode operation. As such, no changes to a current host implementation are needed if a communication module with a conventional host interface is replaced with a communication module with a multi-mode interface in accordance with aspects of the present invention.

In accordance with other aspects of the present invention, methods for implementing a way to gain access to memory and registers of a communication module, such as a BT-LEE type communication module, remotely over an air interface are described. In accordance with these aspects, remote reconfiguration of registers of a communication module in a host-less mode or in a simplified host mode is allowable. Data packets are used to transfer configuration data to registers and to read and write data from and to memory of a communication module.

Figure 10:
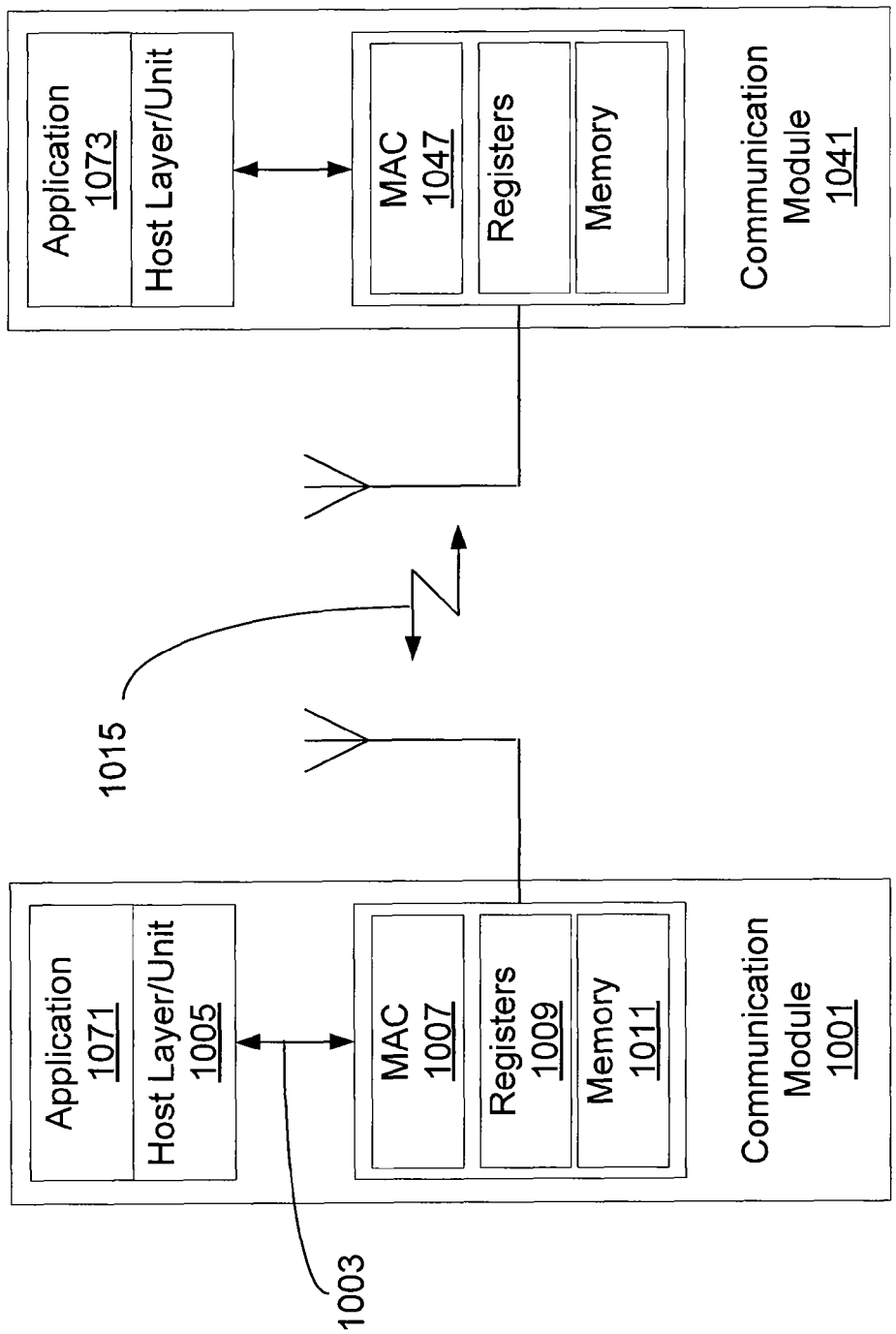
FIG. 10 illustrates an example of a system of wireless communication modules in communication in accordance with at least one aspect of the present invention.

In full-host mode operation, register access over an air interface may be implemented with the communication between host layers or on an application level. FIG. 10 illustrates such an illustrative configuration. The application 1073 in an initiator communication module 1041 may request an Advertiser communicator module 1001 to change its register 1009 values. However, initiator communication module 1041 has no direct remote access to the MAC layer 1007 registers 1009 of Advertiser communication module 1001. An application 1071 of the Advertiser communication module may accept or refuse the request to access register 1009. The communication between applications 1071 and 1072 requires establishment of a connection between the modules. A request to change an advertisement period is one example of a register access request between two modules operating in a full-host mode.

In some embodiments, the register access from modules may be limited to a certain group of modules in host-less and simplified host modes. Information about modules 1041 permitted to gain register 1009 access over an air interface 1015 to a module 1001 may be stored in the registers 1009 of the MAC layer 1007 of the module 1001. Alternatives include permitting access rights to only one module or to all modules within an established communication range. When some modules, but not all modules, are permitted to perform remote configuration, a list of permitted modules, such as module 1041, and the size of MAC layer 1047 registers, such as register 1049, defining the permitted accesses, may increase to an impractically large size. One manner to overcome such a problem is to use an access code instead of an IEEE address in defining the group of modules which are permitted to change register values.

In a simplified host mode operation, the register access may be used to define the parameters of a host interface, such as interface 1003. A small amount of data is transferred between the simplified host layer, such as host layer 1005, and the MAC layer, such as MAC layer 1007. For example, the format of data, number of samples per packet, in Payload mode, number of bits per sample, and frequency of a sample clock in a serial interface implementation may be configured.

In host-less mode and simplified host mode operations, the use of transmitter, Tx, and receiver, Rx, buffer memories 1011 reserved for payload data may be very low. In these modes, the establishment of a connection is limited and therefore transfer of payload data is low or none. Therefore, buffer memories 1011 may be used for RFID tag-like functionalities. The total size of buffer memory 1011 in the current BT-LEE implementation is 1 kbyte. The memory space 1011 contains two Tx and two Rx buffers that are 255 bytes each. Additionally, some external or otherwise dedicated memory may be used for remote memory access. In full-host mode operation, remote memory access may require dedicated memory since buffer memories are used for buffering of payload data in a communication mode.

MAC State Machine

Figure 11:
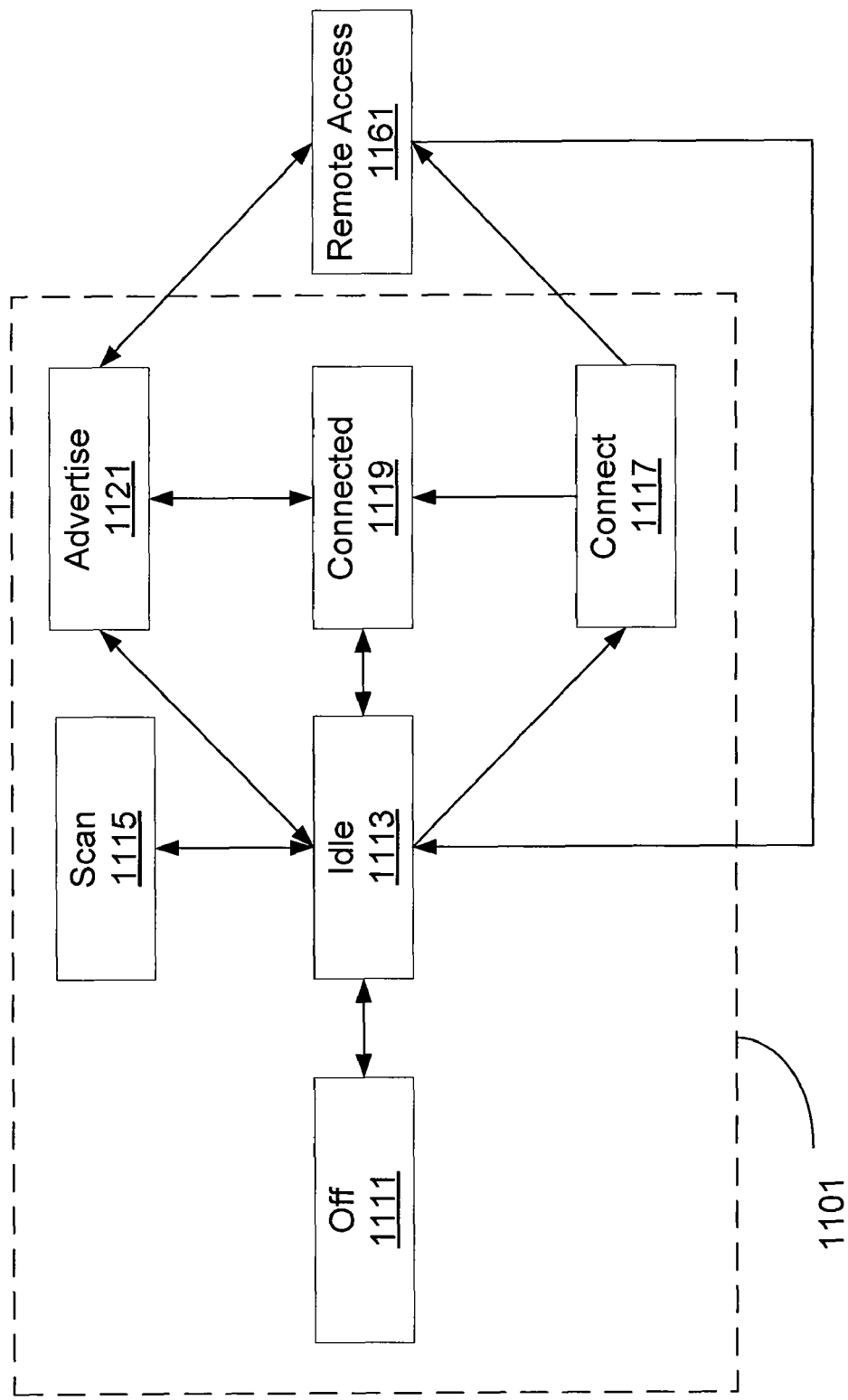
FIG. 11 illustrates a block diagram of a state machine of a BT-LEE MAC layer in accordance with at least one aspect of the present invention.

A conventional state machine of BT-LEE MAC functionality is illustrated by the components 1111-1121 within the broken line box 1101 as shown in FIG. 11. In accordance with at least one aspect of the present invention, new state 1161 is used for remote register and memory accesses. The transfers between different states differ depending on the role of the module.

For an Advertiser module, remote register and memory procedure starts from the Advertise state 1121. In Advertise state 1121, the Advertiser module listens to responding modules at a predefined time, such as after every ID_INFO packet. If an initiator module responds to the ID_INFO packet with a register or memory request packet, the Advertiser module goes to a Remote Access state 1161. If the initiator module is permitted to make a register or memory access, the corresponding procedure is executed. After the procedure, the Advertiser module returns back to Advertise state 1121. Otherwise, the Advertise module informs the initiator module with a response packet that the access is denied and returns to Advertise state 1121.

Figure 15:
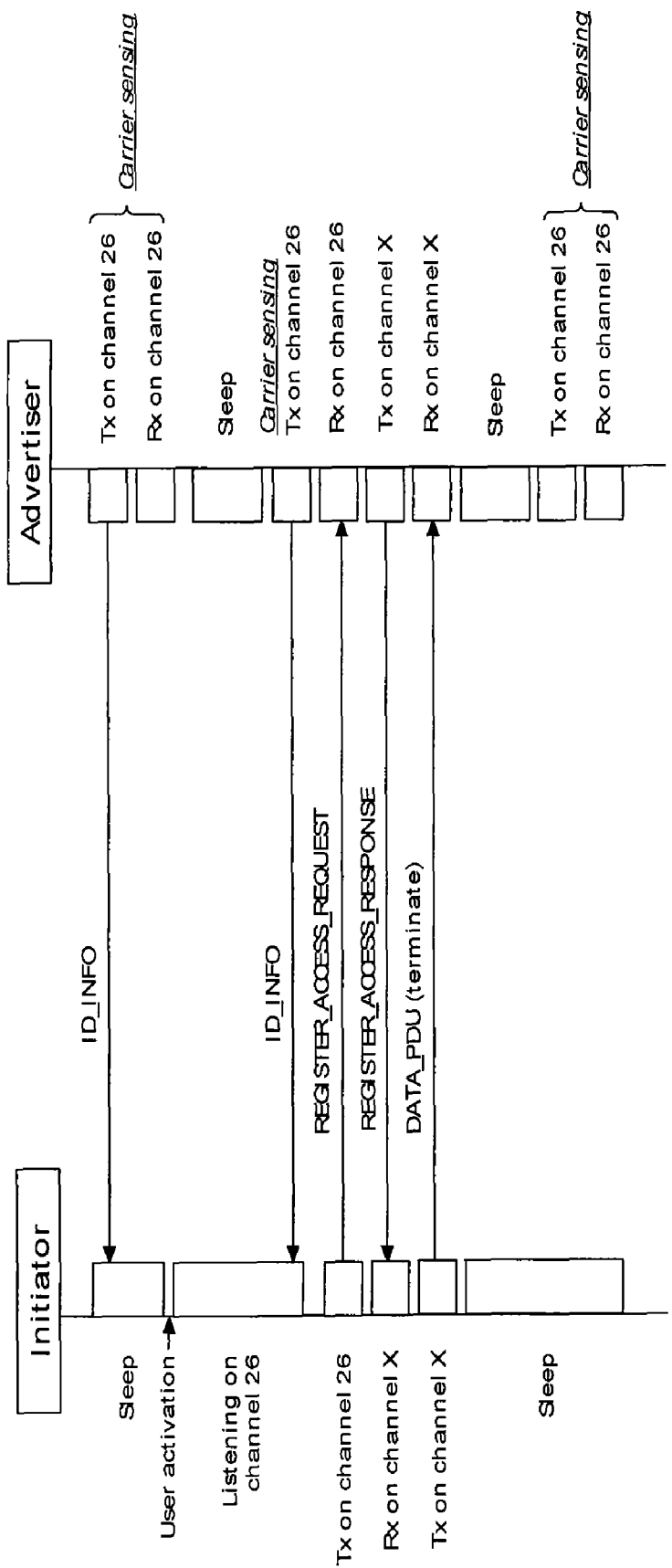
FIG. 15 illustrates an example data exchange sequence for register configuration between an initiator module and an Advertiser module in accordance with at least one aspect of the present invention.
Figure 20:
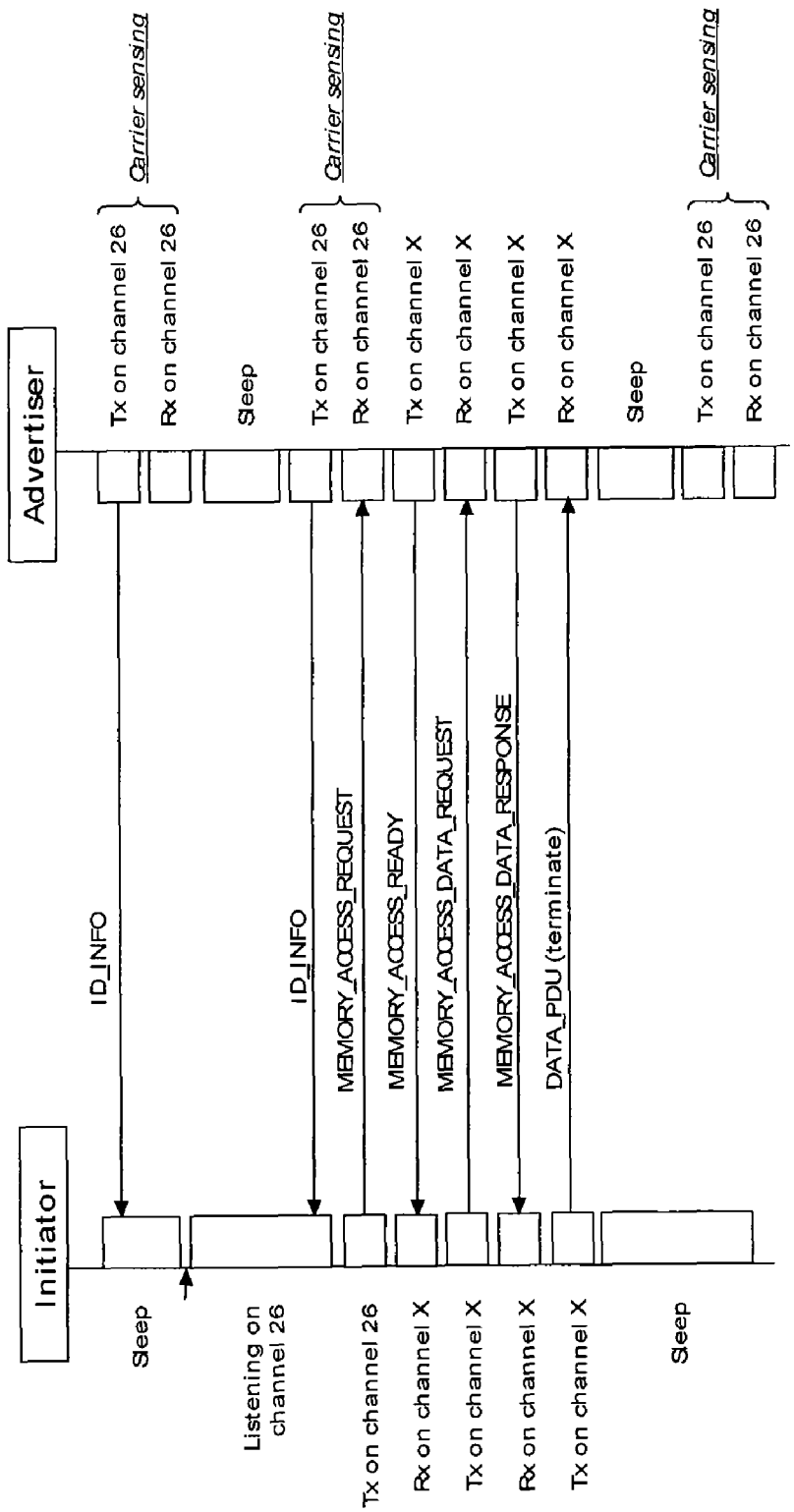
FIG. 20 illustrates an example data exchange sequence for memory access between an initiator module and an Advertiser module in accordance with at least one aspect of the present invention.

For an initiator module, remote register and memory procedures start from Idle state 1113. The application controlling the host layer of the initiator module commands the MAC layer to change to Scan state 1115. After the Scan period, the initiator module knows which Advertiser devices are inside of the established communication range and the MAC returns to Idle state 1113. If the initiator module wants to make a register or memory access request to an Advertiser module, the application of the initiator module commands the MAC layer to Connect state 1117 with parameter register/memory access. If the initiator module in Connect state 1117 receives an ID_INFO packet transmitted by the desired module, the initiator module sends an appropriate request packet and changes to Remote Access state 1161. If the access is permitted, the corresponding procedure, described more fully below with respect to FIG. 15 and FIG. 20, is executed. Otherwise, the Advertiser module informs the initiator module that the access is denied and the initiator module returns to Idle state 1113.

New Packets

In BT-LEE technology, there are two low-level packet types, ID_INFO and DATA_PDU packets. The DATA_PDU packets are further divided into different types. FIG. 12 illustrates the packet format of a general DATA_PDU packet. The TYPE field describes what type of packet is in question and different DATA_PDU types are listed in Table 1. In accordance with aspects of the present invention, new packet types include TYPE fields 00110, 00111, 01000, 01001, and 01010.

TABLE 1

TYPE field descriptions

| TYPE | Description |
|---|---|
| 00000 | DATA_PAYLOAD |
| 00001 | ID_INFO_RESPONSE |
| 00010 | TERMINATE |
| 00011 | SNIFF_REQ |
| 00100 | SNIFF_RSP |
| 00101 | REGISTER_ACCESS_REQUEST |
| 00110 | REGISTER_ACCESS_RESPONSE |
| 00111 | MEMORY_ACCESS_REQUEST |
| 01000 | MEM_ACC_READY |
| 01001 | MEM_ACC_DATA_REQ |
| 01010 | MEM_ACC_DATA_RSP |

Register Access

For memory and register access over an air interface in accordance with aspects of the present invention, new packets have been developed. Register access functionality includes two new packets: REGISTER_ACCESS_REQUEST and REGISTER_ACCESS_RESPONSE. An initiator module that wants to perform a register configuration sequence over an air interface transmits the REGISTER_ACCESS_REQUEST packet. The REGISTER_ACCESS_RESPONSE packet is a response that an Advertiser module uses to indicate the successfulness of the register access request. FIGS. 13 and 14 illustrate example packet formats for a REGISTER_ACCESS_REQUEST packet and a REGISTER_ACCESS_RESPONSE packet, respectively. FIG. 15 illustrates an example packet exchange sequence for register access over an air interface.

The 5-bit Unicast Channel field of the REGISTER_ACCESS_REQUEST packet shown in FIG. 13 is used similarly as in an ID_INFO_RESPONSE packet. The Unicast Channel field specifies the frequency channel where an Advertiser module responds with the REGISTER_ACCESS_RESPONSE packet. The 40-bit Source address field, shown in FIG. 13, is the device address of the initiator module. The 1-bit R/W field specifies whether the initiator module wants to read from, R/W='0', or write to R/W='1', the register values. The 7-bit Register Address field specifies the address of the accessed register and the 8-bit Register Value field specifies the value to be written. The Register Value field may only be present in the packet in FIG. 13 if the R/W bit is set to '1', the Write mode.

With respect to FIG. 14, in the REGISTER_ACCESS_RESPONSE packet, the R/W field and Register Address field are copied from the corresponding REGISTER_ACCESS_REQUEST packet. The 8-bit Register Value field includes the value of the register specified by the Register Address, both in Read and Write mode. The 8-bit Success code field identifies whether the register access was successful or did some error occur in some point of operation. Illustrative values of the Success code field are shown in Table 2.

TABLE 2

Definitions of Success code field of REGISTER_ACCESS_RESPONSE packet

| Success code | Description |
|---|---|
| 00000000 | Register access successful |
| 00000001 | No register access permission |
| 00000010 | No write permission |
| 00000011 | Invalid register address |
| 00000100 | Invalid register value |
| 00000101 | No direct register access available |

It should be understood by those skilled in the art that the length of the fields and registers in BT-LEE MAC may be constant and may be different from those illustrated herein. For example, every register may be 1 byte, i.e., 8 bits.

The data exchange sequence between initiator and Advertiser modules for a single remote register access is presented in FIG. 15. The sequence starts from the situation where the Advertiser module allowing register configuration over an air interface is in an Advertise state, such as Advertise state 1121. Advertiser module transmits ID_INFO packets sequentially. After every ID_INFO packet. Advertiser module listens to see if an initiator module responds to the ID_INFO packet. The configuration is similar to a connection set-up sequence.

Initiator module may request the register configuration by sending a REGISTER_ACCESS_REQUEST packet during the time slot that is reserved for responses after the ID_INFO packet. The structure of the REGISTER_ACCESS_REQUEST packet is described above with reference to FIG. 13. According to the data received in the REGISTER_ACCESS_REQUEST packet, Advertiser module informs initiator module about the configuration result by sending REGISTER_ACCESS_RESPONSE packet which is described above with reference to FIG. 14. The response may be transmitted on a unicast channel which is selected by the initiator module. The frequency number of the unicast channel may be included in the REGISTER_ACCESS_REQUEST packet.

A buffer in the MAC enables buffering of register data. Advertiser module configures the corresponding register if the configuration of the register is permitted to the initiator module. The register may be updated with the value in the buffer if the next REGISTER_ACCESS_REQUEST or DATA_PDU packet with a "terminate connection" parameter is received successfully and the ACK bit of the packet header confirms that the initiator module received the preceding REGISTER_ACCESS_RESPONSE packet correctly. Otherwise, the data in the buffer is deleted and the register value is left unchanged. One reason for buffering of the register data and delaying the update of the register value is to ensure that the data is not changed in the Advertiser module without the initiator module receiving a confirmation of the change. In such a case with lost packets or a dropped connection, an initiator module may lose the control of register values without the confirmation.

Initiator module may continue register configuration by immediately sending another REGISTER_ACCESS_REQUEST packet after it has received the previous REGISTER_ACCESS_RESPONSE or it may terminate the configuration by sending a DATA_PDU packet with a terminate flag. The initiator of the register access may ensure the successfulness of the register access by reading the register value.

In cases where several registers are configured consecutively, it is not required to transfer a number of unicast channels and a source address of the initiator module in REGISTER_ACCESS_REQUEST packets. Therefore, two manners exist to implement consecutive register accesses. In a first manner, the same packet structure for a REGISTER_ACCESS_REQUEST packet on advertisement and unicast channels may be used. In a second manner, a dedicated REGISTER_ACCESS_REQUEST packet structure may be used for requests transmitted on unicast channels. For the first manner, the unicast channel information and source address field may be neglected. Conventional re-transmission procedures are valid also in remote register access procedure.

Memory Access

For implementations of accessing a memory space, four packets are introduced: MEMORY_ACCESS_REQUEST, MEMORY_ACCESS_READY, MEMORY_ACCESS_DATA_REQUEST and MEMORY_ACCESS_DATA_RESPONSE. Illustrative packet formats for these packet types are shown in FIGS. 16-19 respectively.

The Unicast Channel and Source address fields are defined as in ID_INFO_RESPONSE and REGISTER_ACCESS_REQUEST packets. The R/W bit defines if the initiator module wants to read from, R/W='0', or write to, R/W='1', memory contents. The two Future Use (FU) bits may be left unused.

An Advertiser module responds with a MEMORY_ACCESS_READY packet to confirm that it has changed to a memory access state. The MEMORY_ACCESS_READY packet includes a Success Code field that identifies whether the initiator module is permitted to access memory and/or whether the initiator module allowed to write to the memory, if R/W='1' in the corresponding MEMORY_ACCESS_REQUEST. The MemoryType field defines a memory type and amount of memory.

The MEMORY_ACCESS_DATA_REQUEST packet may include the following fields: Start address, R/W, Length, and Memory value. The 16-bit Start address field specifies the start memory address and the 7-bit Length field specifies how many bytes starting from the Start address are read from or written to. The 1-bit R/W field specifies if the initiator module wants to read from, R/W='0', or write to, R/W='1', memory contents. In the case were R/W='1', the Memory Value field contains the written data.

The Start Address and R/W fields of the MEMORY_ACCESS_DATA_RESPONSE packet are copied from the corresponding MEMORY_ACCESS_DATA_REQUEST packet. In the case of a memory read operation, R/W='0', there also exists a Memory Value field, which includes the memory contents of Length bytes starting from the Start address.

An illustrative data exchange sequence for memory access over an air interface is shown in FIG. 20. The sequence begins from the same point, i.e., an Advertiser module in an advertise state, as in the register configuration sequence. The module requesting memory access, i.e., the initiator module, responds to an ID_INFO packet by sending a MEMORY_ACCESS_REQUEST packet, which is described above with reference to FIG. 18. The packet contains the number of the selected unicast channel and the source address of the initiator module. In addition, the MEMORY_ACCESS_REQUEST packet contains information regarding whether the initiator module wants to read from or write to memory contents.

The Advertiser module responds to the request by sending a MEMORY_ACCESS_READY packet in the unicast channel. After the initiator module receives the MEMORY_ACCESS_READY packet, it sends a MEMORY_ACCESS_DATA_REQUEST packet that contains a start address and length of the memory area that it is reading from or writing to. Then the Advertiser module sends the requested memory content in a MEMORY_ACCESS_DATA_RESPONSE packet. In the case of a write request, the memory content is not present, while the address, length, and write success parameters are included to verify the write operation. If the initiator module receives a MEMORY_ACCESS_DATA_RESPONSE packet correctly, it sends a terminate DATA_PDU packet to terminate the memory access procedure.

In accordance with aspects of the present invention, consecutive memory accesses are also possible. In such a situation, the initiator module does not send a terminate DATA_PDU packet, but rather sends a new MEMORY_ACCESS_DATA_REQUEST packet after the previous MEMORY_ACCESS_DATA_RESPONSE from the Advertiser module. The memory access sequence may continue until the initiator module finally sends a terminate DATA_PDU packet.

To avoid extra buffering of data, the memory content may be updated immediately after reception of a MEMORY_ACCESS_DATA_REQUEST packet if the access is allowed. Conventional re-transmission procedures for BT-LEE technology known by those skilled in the art are also valid in remote memory access procedures.

Figure 21:
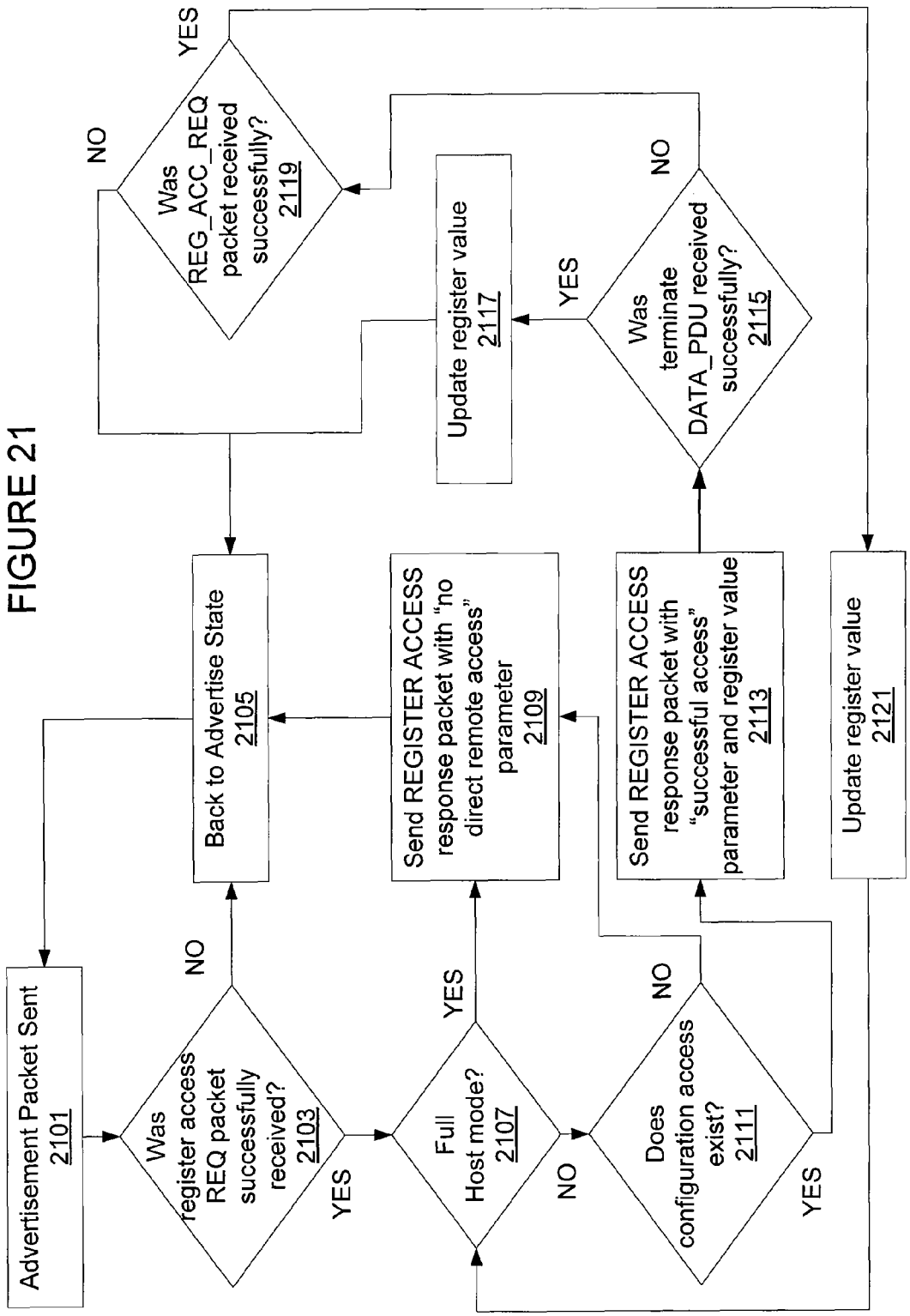
FIG. 21 is a flowchart of an illustrative method for requesting register configuration access of an Advertiser module in accordance with at least one aspect of the present invention.
Figure 22A:
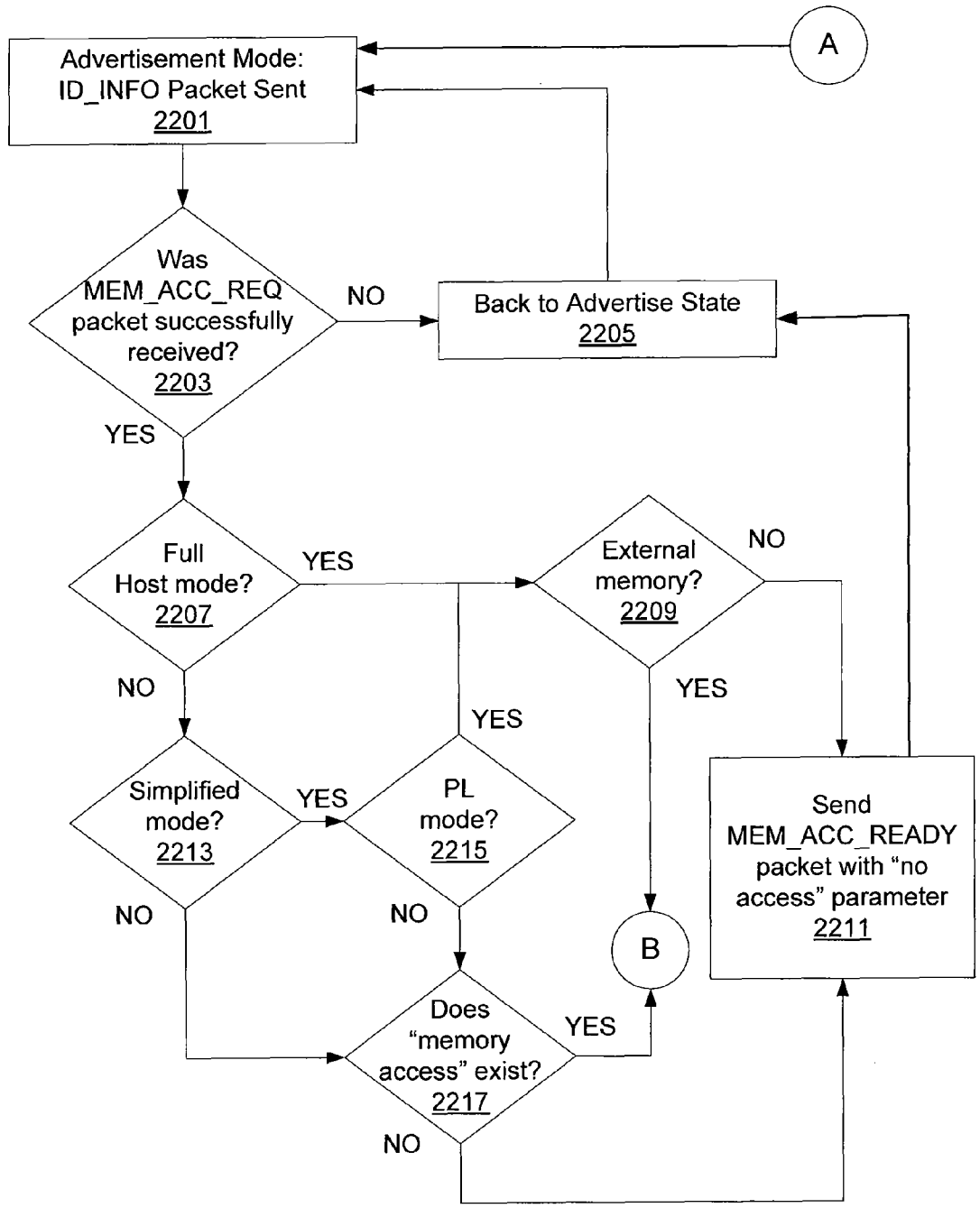
FIGS. 22A-22B are a flowchart of an illustrative method for requesting memory access to an Advertiser module in accordance with at least one aspect of the present invention.
Figure 22B:
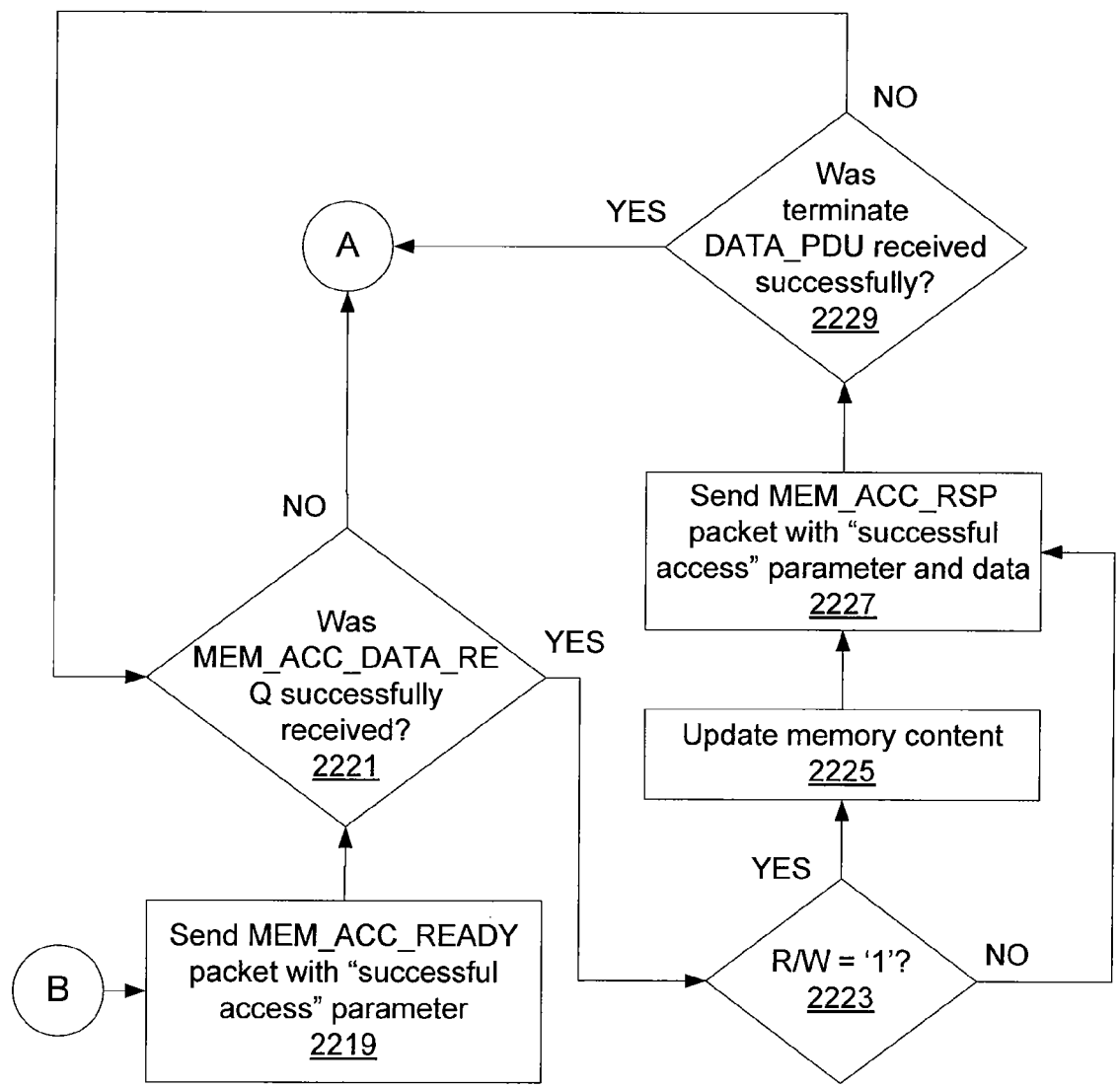

The example sequence charts illustrated in FIG. 15 and FIG. 20 are described in more detail as flow charts in FIG. 21 and FIGS. 22A-22B, respectively. The flow chart of FIG. 21 presents operation of an Advertiser module register access over an air interface. The process begins at step 2101 where an Advertisement packet is sent. At step 2103 a determination is made as to whether the register access request packet was successfully received. If not, the process moves to step 2105 where the Advertiser module returns to an Advertise state and the process proceeds back to step 2101. If the register access request packet was successfully received in step 2103, the process moves to step 2107.

At step 2107, a determination is made as to whether the Advertiser module is operating in full host mode operation. If the Advertiser module is operating in full host mode operation, the process moves to step 2109 where the Advertiser module sends a register access response packet with a "no direct remote access" parameter, corresponding to a denial of remote access to the registers of the Advertiser module. The process then proceeds to step 2105. If the Advertiser module is not operating in full host mode operation in step 2107, the process moves to step 2111 where another determination is made. At step 2111, a determination is made as to whether configuration access exists for the initiator module seeking access. If not, the process moves back to step 2109 where a denial response packet is sent. Else, if configuration access does exist in step 2111, the process proceeds to step 2113.

At step 2113, the Advertiser module sends a register access response packet with a "successful access" parameter and the requested register value, corresponding to permission of remote access to the registers of the Advertiser module. The process moves to step 2115 where another determination is made as to whether a terminate DATA_PDU packet was received successfully. If so, the process moves to step 2117 where the register value is updated before proceeding back to step 2105. If a terminate DATA_PDU packet was not received successfully in step 2115, the process proceeds to step 2119 where a determination is made as to whether another register access request packet was successfully received. Such may be the case for multiple consecutive register accesses. In consecutive register accesses, the initiator module sends a new REGISTER_ACCESS_REQUEST packet instead of a terminate DATA_PDU packet and the Advertiser module responds correspondingly with a REGISTER_ACCESS_RESPONSE packet. If another register access request packet was not successfully received at step 2119, the process moves back to step 2105. Else, if another register access request packet was successfully received at step 2119, the process moves to step 2121 where the register value is updated before the process returns to step 2107.

The flow chart of FIGS. 22A-22B present operation of an Advertiser module memory access over an air interface. It presents the remote memory access procedure from the perspective of an Advertiser module. Multiple consecutive memory accesses may be done, and after a last memory access event, the module returns to an Advertise state. The process begins at step 2201 where an Advertiser module is in an Advertise state and an ID_INFO packet is sent to the requesting initiator module. At step 2203 a determination is made as to whether a MEMORY_ACCESS_REQUEST packet was successfully received. If not, the process moves to step 2205 where the Advertiser module returns to an Advertise state and the process proceeds back to step 2201. If the MEMORY_ACCESS_REQUEST packet was successfully received in step 2203, the process moves to step 2207.

At step 2207, a determination is made as to whether the Advertiser module is operating in full host mode operation. If the Advertiser module is operating in full host mode operation, the process moves to step 2209 where another determination is made as to whether the request corresponds to an external memory from the Advertiser module. If not, the process moves to step 2211 where the Advertiser module sends a MEMORY_ACCESS_READY packet with a "no access" parameter, corresponding to a denial of remote access to the memory of the Advertiser module. The process then proceeds back to step 2205. If the request is directed to external memory in step 2209, the process moves to step 2219 described below.

Returning to step 2207, if the Advertiser module is not operating in full host mode operation, the process moves to step 2213 where another determination is made. At step 2113, a determination is made as to whether the Advertiser module is operating in a simplified host mode operation. If the Advertiser module is operating in a simplified host mode operation, the process moves to step 2215 where a determination is made as to whether the Advertiser module is operating in a Payload sub-mode compared to a ServiceField sub-mode. If the Advertiser module is operating in a Payload sub-mode, the process proceeds to step 2209 as described above. If the Advertiser module is not operating in Payload sub-mode but rather the ServiceField sub-mode, the process proceeds to step 2217. In addition, if the Advertiser module is not operating in a simplified host mode operation in step 2213, the process moves to step 2217.

At step 2217, a determination is made as to whether the initiator module has access rights to read from or write to the memory of the Advertiser module. If not, the process proceeds to step 2211 where the Advertiser module sends a MEMORY_ACCESS_READY packet with a "no access" parameter, corresponding to a denial of remote access to the memory of the Advertiser module. If the initiator module does have access rights in step 2217, the process moves to step 2219. In step 2219, the Advertiser module sends a memory access ready packet, such as a "MEM_ACC_READY" packet, corresponding to permission of remote access to the memory of the Advertiser module.

The process then proceeds to step 2221 where a determination is made as to whether a memory access data request packet, such as a "MEM_ACC_DATA_REQ" packet, was successfully received form the initiator module. If not, the process returns back to step 2201. If a memory access data request packet was successfully received in step 2221, the process moves to step 2223 where a determination is made as to whether the initiator module wants to read from or write to the memory of the Advertiser module. If the initiator module wants to write to the memory, R/W='1', the process moves to step 2225 where the content of the memory is updated and the process proceeds to step 2227. If the initiator wants to read from the Advertiser memory, R/W='0', the process moves directly to step 2227 where the Advertiser module sends a memory access response packet, such as a "MEM_ACC_RSP" packet with a successful access parameter and the corresponding data. Finally, the process moves to step 2229 where a determination is made as to whether a terminate DATA_PDU packet was received successfully. If so, the process moves back to step 2201. If not, the process returns to step 2221.

The memory type in a communication module may be of a number of different types. It cannot be assumed that configuration settings or content of a memory are stored into another module, e.g., an initiator module, and that the initiator module would configure the settings every time when configuration is needed. Therefore, the memory type in a module may be non-volatile, i.e., the content in the registers and memory will not disappear if the device runs out of battery life. For example, EPROM, EEPROM, and Flash memory types are non-volatile. Non-volatile memories are used in RFID tag implementations.

In accordance with aspects of the present invention, register access and memory access procedures may be different for several reasons. Firstly, register accesses may be shorter in time than memory accesses. A potentially longer memory access may be performed on a uni-cast channel to avoid jamming of advertisement channels. The use of a uni-cast channel may need the transfer of multiple packets to command the advertiser device from an advertisement channel to a uni-cast channel. In addition, if a memory space is relatively large, one memory access may need the transfer of consecutive MEMORY_ACCESS_DATA packets to both directions while MEMORY_ACCESS_REQUEST and MEMORY_ACCESS_READY packets may be needed only in the beginning of a memory access procedure.

Secondly, a memory space may vary more from implementation to implementation than a register space and the field in a MEMORY_ACCESS_READY packet may therefore be used to define the memory space. Thirdly, the data of register accesses may be buffered more easily on a host-less chip. Therefore, e.g., the cyclic redundancy check (CRC) of a register access may be checked before the register value is actually changed on the chip, and a simpler packet transfer procedure may be used. For a memory access, there may be no space for long buffers on a host-less integrated circuit (IC) and therefore the memory on a host-less IC would be updated immediately during the reception of MEMORY_ACCESS_DATA_REQUEST packets. If the CRC check of a MEMORY_ACCESS_DATA_REQUEST packet fails, there would be no way for the host-less IC to cancel the memory access if no buffer memories exist. Therefore, the host behind the air interface may handle the memory control so that it reads the original memory content, if necessary, and after the memory access, it may check that the new content on the host-less IC is correct. The cancellation of memory access may be done by the host behind the air interface with a new memory access by sending the buffered old data to the host-less IC, if necessary.

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present invention. The description is thus to be regarded as illustrative instead of restrictive on the present invention.

We claim:

1. A method comprising:
    determining whether a wireless communication module has been released from a reset state;
    detecting the presence of signals of a host interface between a host layer and a medium access control layer of the wireless communication module when the wireless communication module is determined to have been released from the reset state;
    determining, from the detected signals, a mode of operation for the wireless communication module, wherein the mode of operation specifies a level of involvement of the host layer of the wireless communication module when the wireless communication module is in an active state; and
    automatically entering the mode of operation based upon the detected signals, wherein communication of the wireless communication module with one or more other devices and read/write access to one or more registers of the wireless communication module in the entered mode of operation do not use any host layer of the wireless communication module when the entered mode of operation is a host-less mode.

2. The method of claim 1, wherein the determining a mode of operation includes determining the state of at least two of the detected signals.

3. The method of claim 2, wherein when the mode of operation is a simplified host mode of operation, data flow from the wireless communication module is limited.

4. The method of claim 3, further comprising determining whether a sub-mode of operation within the simplified host mode of operation has been selected.

5. The method of claim 4, wherein the sub-mode corresponds to a ServiceField sub-mode of operation, wherein data is transferred within a ServiceField field of an ID-packet.

6. The method of claim 4, wherein the sub-mode corresponds to a payload sub-mode of operation, wherein data is transferred within a DATA-packet.

7. The method of claim 2, wherein the at least two signals include an SS signal, a MOSI signal, and a SCLK signal.

8. The method of claim 7, wherein the SS signal identifies whether the mode of operation is a full host mode of operation.

9. The method of claim 7, wherein the MOSI signal identifies a sub-mode of operation of a simplified host mode of operation for the mode of operation.

10. The method of claim 7, wherein the SCLK signal identifies whether the mode of operation is the host-less mode of operation.

11. The method of claim 10, wherein the MOSI signal identifies whether remote configuration of the one or more registers of the wireless communication module is permitted.

12. The method of claim 11, further comprising:
determining a request to change from the entered mode of operation; and
entering a new mode of operation of the wireless communication module based upon the determined request when permitted.

13. The method of claim 12, further comprising determining whether the request to change the entered mode of operation is permitted.

14. The method of claim 12, further comprising sending a response denying the request to change the entered mode of operation.

15. The method of claim 1, further comprising:
transmitting an advertisement packet to one or more devices separate from the wireless communication module after the wireless communication module is in the entered mode of operation, wherein the advertisement packet includes an indicator specifying the entered mode of operation.

16. The method of claim 1, further comprising:
determining whether a requesting module is permitted to access a memory space of the wireless communication module; and
outputting a response corresponding to the determining whether the requesting module is permitted.

17. An apparatus comprising:
a processor; and
memory operatively coupled to the processor and storing computer-executable instructions for causing the apparatus to:
receive a request to access at least one of: registers and a memory space of a medium access control layer of a wireless communication module of the apparatus from a requesting module remote from the apparatus, wherein the medium access control layer maintains the registers and the memory space and permits remote access to the registers and the memory space based upon processing of received data without involvement of a host layer of the wireless communication module;
determine a mode of operation of the wireless communication module based on one or more signals detected on a host interface of the wireless communication module, wherein the mode of operation specifies a level of involvement of a host layer of the wireless communication module when the wireless communication module is in an active state; and
determine whether the requesting module is permitted to access the at least one of the memory space and the registers of the medium access control layer based on the determined mode of operation; and
output a response corresponding to the determination of whether the requesting module is permitted to access the at least one of the registers and the memory space.

18. The apparatus of claim 17, wherein the apparatus is a low end extension of Bluetooth type radio module.

19. The apparatus of claim 17, wherein the response includes data corresponding to a denial of access to the registers.

20. The apparatus of claim 19, wherein the mode of operation is determined to be a full host mode of operation.

21. The apparatus of claim 17, wherein upon determining that the requesting module is permitted to access the registers of the medium access control layer, the computer-executable instructions further cause the apparatus to:
determine whether a request to terminate communication has been received from the requesting module; and
upon determining the request to terminate has been received, update a value of at least one of the registers.

22. The apparatus of claim 21, wherein the memory further stores computer-executable instructions for causing the apparatus to:
determine whether a new request to access the registers has been received from the requesting module; and
upon determining the new request has been received, update a value of at least one of the registers.

23. The apparatus of claim 17, wherein the memory further stores computer-executable instructions for causing the apparatus to determine whether the request to access corresponds to a request to access an external memory space upon determining the mode of operation to be a full host mode of operation.

24. The apparatus of claim 23, wherein the response includes data corresponding to acknowledgement of a right to access the external memory space upon determining that the request to access corresponds to a request to access an external memory space.

25. The apparatus of claim 24, wherein the memory further stores computer-executable instructions for causing the apparatus to determine whether the request to access includes a request to write to the external memory space.

26. The apparatus of claim 25, wherein the memory further stores computer-executable instructions for causing the apparatus to update memory content of the external memory space upon determining that the request to access includes a request to write to the external memory space.

27. The apparatus of claim 17, wherein the memory further stores computer-executable instructions for causing the apparatus to determine whether the request to access includes a request to read from the memory space upon determining that the requesting module is permitted to access the memory space of the medium access control layer.

28. The apparatus of claim 27, wherein the response includes content data of the memory space upon determining that the request includes a request to read from the memory space.

29. An apparatus comprising:
a processor; and
memory operatively coupled to the processor and storing computer-executable instructions that, when executed, cause the apparatus to:
determine whether a wireless communication module has been released from a reset state;
detect the presence of signals of a host interface between a host layer and a medium access control layer of the wireless communication module when the wireless communication module is determined to have been released from the reset state;
determine, from the detected signals, a mode of operation for the wireless communication module, wherein the mode of operation specifies a level of involvement of the host layer of the wireless communication module when the wireless communication module is in an active state; and automatically enter the mode of operation based upon the detected signals, wherein communication of the wireless communication module with one or more other devices and read/write access to one or more registers of the wireless communication module in the entered mode of operation do not use any host layer of the wireless communication module when the entered mode of operation is a host-less mode.

30. The apparatus of claim 29, wherein the memory further stores computer-executable instructions for causing the apparatus to determine the state of at least two of the detected signals.

31. The apparatus of claim 30, wherein when the mode of operation is a simplified host mode of operation, data flow from the apparatus is limited.

32. The apparatus of claim 30, wherein computer executable instructions, when executed, further cause the apparatus to transmit an advertisement packet to one or more devices separate from the wireless communication module after the wireless communication module is in the entered mode of operation, wherein the advertisement packet includes an indicator specifying the entered mode of operation.

33. A method comprising:
receiving a request to access at least one of: registers and a memory space of a medium access control layer of a wireless communication module from a requesting module remote from the wireless communication module, wherein the medium access control layer maintains the registers and the memory space and permits remote access to the registers and the memory space based upon processing of received data without involvement of a host layer of the wireless communication module;

determining a mode of operation of the wireless communication module based on one or more signals detected on a host interface of the wireless communication module, wherein the mode of operation specifies a level of involvement of a host layer of the wireless communication module when the wireless communication module is in an active state;

determining whether the requesting module is permitted to access the at least one of the registers and the memory space of the wireless communication module based on the determined mode of operation; and outputting a response corresponding to the determination of whether the requesting module is permitted to access the at least one of the registers and the memory space.

34. The method of claim 33, wherein upon determining that the requesting module is permitted to access the at least one of the registers and the memory space of the wireless communication module, the method further comprising determining whether the request to access includes a request to read from the memory space.

35. The method of claim 33, wherein the mode of operation is determined to be a simplified host mode of operation, the method further comprising determining a sub-mode of operation of the wireless communication module.

36. The method of claim 33, wherein upon determining the mode of operation to be a host-less mode of operation and that the requesting module is permitted to access the memory space, the method further comprising determining whether the request to access includes a request to read from the memory space.

37. One or more non-transitory computer readable media storing computer readable instructions that, when executed, cause an apparatus to:

receive a request to access at least one of: registers and a memory space of a medium access control layer of the apparatus from a requesting module remote from the apparatus, wherein the medium access control layer maintains the registers and the memory space and permits remote access to the registers and the memory space based upon processing of received data without involvement of a host layer of the apparatus;

determine a mode of operation of the wireless communication module based on one or more signals detected on a host interface of the apparatus, wherein the mode of operation specifies a level of involvement of a host layer of the wireless communication module when the wireless communication module is in an active state;

determine whether the requesting module is permitted to access the at least one of the memory space and the registers of the apparatus based on the determined mode of operation; and output a response corresponding to the determination of whether the requesting module is permitted to access the at least one of the memory space and the registers.

38. The one or more computer readable media of claim 37, wherein the computer readable instructions, when executed, further cause the apparatus to determine whether the request to access includes a request to read from the memory space upon determining that the requesting module is permitted to access the at least one of the registers and the memory space of the apparatus.

39. The one or more computer readable media of claim 37, wherein when the mode of operation is determined to be a simplified host mode of operation, the computer readable instructions, when executed, further cause the apparatus to determine a sub-mode of operation of the apparatus.

40. One or more non-transitory computer readable media storing computer readable instructions that, when executed, cause an apparatus to:

determine whether a wireless communication module has been released from a reset state;

detect the presence of signals of a host interface between a host layer and a medium access control layer of the wireless communication module when the wireless communication module is determined to have been released from the reset state;

determine, from the detected signals, a mode of operation for the wireless communication module, wherein the mode of operation specifies a level of involvement of the host layer of the wireless communication module when the wireless communication module is in an active state; and automatically enter the mode of operation based upon the detected signals, wherein communication of the wireless communication module with one or more other devices and read/write access to one or more registers of the wireless communication module in the entered mode of operation do not use the any host layer of the wireless communication module when the entered mode of operation is a host-less mode.

41. The one or more computer readable media of claim 40, wherein the memory further stores computer-executable instructions for causing the apparatus to determine the state of at least two of the detected signals.

42. The one or more computer readable media of claim 41, wherein when the mode of operation is a simplified host mode of operation, data flow from the apparatus is limited.

* * * * *